US006818676B2

(12) United States Patent
Koffler et al.

(10) Patent No.: US 6,818,676 B2
(45) Date of Patent: Nov. 16, 2004

(54) FOAM CUSHION AND METHOD OF MAKING AND USING THE SAME

(75) Inventors: Adam J. Koffler, St. Louis Park, MN (US); Donald W. Hopwood, Crystal, MN (US); Binh Van Hoang, Ho Chi Minh (VN)

(73) Assignee: Phat Cushion, LLC, Las Vegas, NV (US)

( * ) Notice: Subject to any disclaimer, the term of this patent is extended or adjusted under 35 U.S.C. 154(b) by 359 days.

(21) Appl. No.: 10/061,672

(22) Filed: Feb. 1, 2002

(65) Prior Publication Data

US 2002/0120024 A1 Aug. 29, 2002

Related U.S. Application Data

(60) Provisional application No. 60/270,688, filed on Feb. 23, 2001.

(51) Int. Cl.⁷ .................................................. C08J 9/10
(52) U.S. Cl. ........................ 521/140; 521/134; 521/154; 521/189
(58) Field of Search .................................. 521/134, 140, 521/154, 189, 81, 139

(56) References Cited

U.S. PATENT DOCUMENTS

| 3,812,225 | A |   | 5/1974  | Hosoda et al. ................. 264/54 |
| 4,085,239 | A | * | 4/1978  | Briston et al. ............... 427/208 |
| 4,203,815 | A |   | 5/1980  | Noda et al. ............... 204/159.2 |
| 4,418,483 | A |   | 12/1983 | Fujita et al. .................... 36/28 |
| 4,452,920 | A |   | 6/1984  | Joubert ..................... 521/109.1 |
| 4,655,962 | A | * | 4/1987  | Rowland et al. ............... 516/11 |
| 4,692,475 | A | * | 9/1987  | Rowland et al. ............... 521/92 |
| 5,206,075 | A |   | 4/1993  | Hodgson, Jr. ................ 428/216 |
| 5,246,783 | A |   | 9/1993  | Spenadel et al. ............ 428/461 |
| 5,272,236 | A |   | 12/1993 | Lai et al. .................. 526/348.5 |
| 5,278,272 | A |   | 1/1994  | Lai et al. .................. 526/348.5 |
| 5,322,728 | A |   | 6/1994  | Davey et al. ................ 428/296 |
| 5,380,810 | A |   | 1/1995  | Lai et al. ..................... 526/352 |
| 6,221,928 | B1 | * | 4/2001 | Kozma et al. ................. 521/86 |
| 6,242,503 | B1 | * | 6/2001 | Kozma et al. ............... 525/193 |
| 6,262,137 | B1 | * | 7/2001 | Kozma et al. ............... 521/134 |

FOREIGN PATENT DOCUMENTS

| EP | 0071662 A1  | 2/1983  | .............. C08J/9/06  |
| EP | 0425695     | 5/1991  | .............. C08J/9/06  |
| EP | 0726290 A1  | 8/1996  | ........... C08L/21/00   |
| FR | 2488829     | 2/1982  | ........... B29D/27/04   |
| JP | 61-055126   | 3/1986  | .............. C08J/9/04  |
| WO | WO-90/03414 | 4/1990  | ........... C08L/23/08   |
| WO | WO-9858992 A1 | 12/1998 | .............. C08J/9/10 |

OTHER PUBLICATIONS

"Flame Retardants Buyers' Guide ", *American Dyestuff Reporter*, vol. 85, No. 1, By ADR Staff,(Jan. 1996),15–31.
"Rubber—Definition", www.m–w.com, Merriam Webster Dictionary—Online, Online.
ARCAT, "Arcat Home Page", www.arcat.com.
Babrauskas, Vytenis , "Fire hazard comparison of fire–retarded and non–fire–retarded products",*Book, Gaithersburg, MD : Washington, DC : U.S. Dept. of Commerce, National Bureau of Standards*, (1988),86 pages.
Bennett, H , "Antioxidant—Definiton", *Concise chemical and technical dictionary*, 4th enl. ed. English Book xxxviii, 1271 p.: ill.; 25 cm. New York, N.Y.: Chemical Pub. Co., ISBN: 0820602043,(1986), 116.
Bennett, H , "Blowing Agent—Definition", *Concise chemical and technical dictionary*, 4th enl. ed. English Book xxxviii, 1271 p.: ill. ; 25 cm. New York, N.Y.: Chemical Pub. Co., ISBN: 0820602043, (1986),212.
Bennett, H , "Cross–Linking Agent—Definiton", *Concise chemical and technical dictionary*, 4th enl. ed. English Book xxxviii, 1271 p.: ill.; 25 cm. New York, N.Y.: Chemical Pub. Co., ISBN: 0820602043,(1986),352.
Bennett, H , "Cure—Definition", *Concise chemical and technical dictionary*, 4th enl. ed. English Book xxxviii, 1271 p.: ill. ; 25 cm. New York, N.Y.: Chemical Pub. Co., ISBN: 0820602043,(1986),359.
Bennett, H , "Extender—Definition", *Concise chemical and technical dictionary*, 4th enl. ed. English Book xxxviii, 1271 p.: ill. ; 25 cm. New York,N.Y.: Chemical Pub. Co., ISBN: 0820602043,(1986),523.
Bennett, H , "Filler—Definition", *Concise chemical and technical dictionary*, 4th enl. ed. English Book xxxviii, 1271 p.: ill. ; 25 cm. New York, N.Y.: Chemical Pub. Co., ISBN: 0820602043,(1986),535.
Bennett, H , "Plasticizer—Definition", *Concise chemical and technical dictionary*, 4th enl. ed. English Book xxxviii, 1271 p.: ill. ; 25 cm. New York, N.Y.: Chemical Pub. Co., ISBN: 0820602043,(1986),911.
Bennett, H , "Reinforcing Agent—Definition", *Concise chemical and technical dictionary*, 4th enl. ed. English Book xxxviii, 1271 p.: ill. ; 25 cm. New York, N.Y.: Chemical Pub. Co., ISBN: 0820602043,(1986),980.
Bennett, H , "Resin—Definition", *Concise chemical and technical dictionary*, 4th enl. ed. English Book xxxviii, 1271 p.: ill. ; 25 cm. New York, N.Y.: Chemical Pub. Co., ISBN: 0820602043,(1986),982–983.
Bennett, H , "Stabilizer—Definition", *Concise chemical and technical dictionary*, 4th enl. ed. English Book xxxviii, 1271 p.: ill. ; 25 cm. New York, N.Y.: Chemical Pub. Co., ISBN: 0820602043,(1986),1063.

(List continued on next page.)

*Primary Examiner*—Morton Foelak
(74) *Attorney, Agent, or Firm*—Schwegman, Lundberg, Woessner & Kluth, P.A.

(57) ABSTRACT

The present invention provides a foam cushion, a method of making the foam cushion, and a method of using the foam cushion. The foam cushion is formed from: (a) at least one of rubber and a resin; (b) a blowing agent; (c) a polymeric adhesion modifier; (d) a decomposition accelerating agent, and (e) a cross-linking agent.

34 Claims, No Drawings

OTHER PUBLICATIONS

Bennett, H , "Synthetic Resin—Definition", *Concise chemical and technical dictionary*, 4th enl. ed. English Book xxxviii, 1271 p.: ill. ; 25 cm. New York, N.Y.: Chemical Pub. Co., ISBN: 0820602043,(1986),1096.

Bennett, H , "Vulcanization—Definition", *Concise chemical and technical dictionary*, 4th enl. ed. English Book xxxviii, 1271 p.: ill. ; 25 cm. New York, N.Y.: Chemical Pub. Co., ISBN: 0820602043,(1986),1206.

Fire Retardant Chemicals Assoc., "Flame retardants—101: basic dynamics", *Book, 220 p.: ill.; 28 cm. [Lancaster, PA]: Fire Retardant Chemicals Association*,(Mar. 24–27, 1996), 1–220.

Hairston, Deborah W., "Flame Retardants: Cool Under Fire", *Chemical Engineering*, 109(9), (Sep. 1995),65–68.

Klempner, Daniel , et al., "Handbook of polymeric foams and foam technology", *Munich ; New York : New York : Hanser*, (1991), 196–242.

Kroschwitz, Jacqueline I., "Flame Retardants (Phosphorous)".*Kirk–Othmer Encyclopedia of Chemical Technology; Explosives and Propellants to Flame Retardants for Textiles*, Fourth Edition, vol. 10, John Wiley & Sons,(1993),976–998.

Kroschwitz, Jacqueline I., "Phosphorous Containing Polymers", *Encyclopedia of polymer science and engineering; Peroxy Compounds to Polyesters*, vol. 11, ISBN:0–471–80943–8, John Wiley & Sons,(1988),96–111.

Kroschwitz, Jacqueline I., "Wood",*Kirk–Othmer Encyclopedia of Chemical Technology; Vitamins to Zone Refining*, John Wiley & Sons, ISBN: 0471–52694–0 (v. 25),(1998), 627–664.

Morris, William , "Press—Definition", *The American heritage dictionary of the English language,Boston ; Houghton Mifflin*, (1981),1036.

Parker, Sybil , et al., "Resin (Synthetic Resin)—Definition", *McGraw–Hill Concise Encyclopedia of Science& Technology*, Hardcover: 2450 pages, Publisher: McGraw–Hill Professional; 4th edition (May 1, 1998), ISBN: 0070526591, (1998),1666.

Society of Plastics Engineers, "Fire safety through use of flame retarded polymers", *Book, Polymer Modifiers and Additives Division and the Fire Retardant Chemicals Association, Lancaster, Pa. : The Association*, Adam's Mark Hotel, Houston, Texas,(1985).

Technomic Publishing Company, "Handbook of flame retardant chemicals and fire testing services", *Book, Lancaster, Pa., U.S.A.: Technomic Pub. Co.,*, (1988).

Troitzsch, Jurgen H., "Fire Retarded Polymer Applications: Developments in Europe and the Us", *Book, Technomic Publishing Co*, (1997).

* cited by examiner

FOAM CUSHION AND METHOD OF MAKING AND USING THE SAME

CROSS-REFERENCE TO RELATED APPLICATION

This application claims benefit under 35 U.S.C. 119(e) of U.S. Provisional Application Ser. No. 60/270,688 filed Feb. 23, 2001; which is incorporated herein by reference in its entirety.

BACKGROUND OF THE INVENTION

Carpet padding, or carpet cushion, is typically used (i.e., placed below a carpet) to make the carpet feel more comfortable, to act as a shock absorber for the carpet, to extend the life of the carpet, and/or to insulate the floor. There are several types of carpet padding that are currently used, e.g., waffle rubber, foam padding, rebond, slab rubber, fiber, berber pad, and frothed foam. There are several disadvantages with the use of many of these types of carpet padding. For example, the rubber used to make waffle rubber carpet padding is held together with clay type binders that break down with use. The use of foam padding typically results in the carpet moving up and down so much that the backing soon breaks down. Rebond carpet padding contains chemicals (e.g., butylated hydroxy toluene-BHT) that have adverse effects on certain carpets. The off gas from rebond has caused some carpets to exhibit yellow blotches on the surface of the fiber. This event seems to occur with commercial and Berber type carpets. Many carpet paddings do not effectively repel liquids and moisture and therefore allow the carpets to become stained. Additionally, many of these carpet paddings are relatively heavy, which increases shipping costs, which are ultimately passed down to the consumer.

As such, there is a need for a carpet padding that avoids these disadvantages. Specifically, the carpet padding should not deteriorate with normal use over an extended period of time (e.g., up to about 20 years, up to about 10 years, or up to about 5 years). The use of the carpet padding should not result in the carpet moving up and down so much that the backing of the carpet breaks down prematurely. The carpet padding should not contain any chemicals (e.g., volatile organic compounds such as BHT) that have adverse effects on the carpet or that are environmentally unfriendly. The carpet padding should make the carpet feel more comfortable and should act as a shock absorber for the carpet. The carpet padding should be resilient, sturdy, and tear resistant over an extended period of time (e.g., up to about 20 years, up to about 10 years, or up to about 5 years). The carpet padding should effectively repel liquids and moisture. The carpet padding should extend the life of the carpet and should effectively insulate the floor. The carpet padding should be relatively inexpensive to manufacture, especially on a commercial (e.g., kilogram) scale.

SUMMARY OF THE INVENTION

The present invention provides a foam cushion, a method of making the foam cushion, and a method of using the foam cushion. The foam cushion is resilient, sturdy, and tear resistant over an extended period of time (e.g., up to about 20 years, up to about 10 years, or up to about 5 years). The foam cushion is relatively inexpensive to manufacture, especially on a commercial (e.g., kilogram) scale. The foam cushion does not deteriorate with normal use over an extended period of time (e.g., up to about 20 years, up to about 10 years, or up to about 5 years). The foam cushion does not contain any chemicals that are environmentally unfriendly. The foam cushion effectively repels liquids and moisture. Additionally, the foam cushion possesses suitable shock absorbent and thermal insulative properties.

The present invention provides for a foam cushion. The foam cushion is formed from: (a) at least one of rubber and a resin; (b) a blowing agent; (c) a polymeric adhesion modifier; (d) a decomposition accelerating agent, and (e) a cross-linking agent.

The present invention also provides for a foam cushion formed from: (a) at least one of natural rubber and an ethylene-vinyl acetate (EVA) copolymer; (b) azodicarbonamide (AC); (c) FUSABOND; (d) dicumyl peroxide; and (e) a combination of zinc oxide and stearic acid.

The present invention also provides for a foam cushion formed from: (a) natural rubber present in about 5 wt. % to about 12 wt. % of the foam cushion; (b) an ethylene-vinyl acetate (EVA) copolymer present in about 79 wt. % to about 83 wt. % of the foam cushion; (c) azodicarbonamide (AC) present in about 3 wt. % to about 4.2 wt. % of the foam cushion; (d) FUSABOND present in about 2.8 wt. % to about 3.9 wt. % of the foam cushion; (e) dicumyl peroxide present in about 0.5 wt. % to about 0.9 wt. % of the foam cushion; and (o) a combination of zinc oxide and stearic acid, wherein the zinc oxide is present in about 1.0 wt. % to about 2.2 wt. % of the foam cushion and stearic acid is present in about 0.5 wt. % to about 1.25 wt. % of the foam cushion.

The present invention also provides for a method for manufacturing a foam cushion, the method comprising the steps of: (a) contacting rubber, a resin, a blowing agent, a polymeric adhesion modifier, and a decomposition accelerating agent to form a first mixture; (b) contacting the first mixture with a cross-linking agent (e.g., a free radical generating agent) to form a second mixture; (c) spreading the second mixture to form one or more sheets; and (d) pressing the one or more sheets at an elevated temperature and an elevated pressure to form a foam cushion.

The present invention also provides for a method for manufacturing a foam cushion, the method comprising the steps of: (a) contacting rubber, a resin, a blowing agent, a polymeric adhesion modifier, and a decomposition accelerating agent to form a first mixture; (b) contacting the first mixture with a cross-linking agent (e.g., a free radical generating agent) to form a second mixture; (c) heating the second mixture; (d) spreading the second mixture to form a sheet; (e) cooling the sheet; (f) stacking a plurality of the sheets; (g) pressing the plurality of the sheets to form a cooked stack; and (h) slicing the cooked stack into sliced pieces to provide the foam cushion.

The present invention also provides for a method for manufacturing a foam cushion, the method comprising the steps of: (a) contacting rubber, a resin, a blowing agent, a polymeric adhesion modifier, and a decomposition accelerating agent for about 8 minutes to about 20 minutes at about 110° C. to about 130° C. to form a first mixture; (b) contacting the first mixture with a cross-linking agent (e.g., a free radical generating agent) for about 1 minute to about 5 minutes at about 110° C. to about 130° C. to form a second mixture; (c) heating the second mixture at about 100° C. to about 120° C. until the second mixture becomes concentrated to about 100 mm thickness; (d) spreading the second mixture to form a sheet; (e) cooling the sheet to below about 80° C.; (f) stacking a plurality of the sheets; (g) contacting the plurality of sheets with a solution comprising a silicone-containing compound; (h) pressing the plurality of the sheets for about 28 minutes to about 35 minutes at about 160° C. to about 175° C. to form a cooked stack; (i) cutting, horizontally, a portion of the top of the cooked stack and removing that portion; (j) cutting, horizontally, a portion of the bottom of the cooked stack and removing that portion; (k) slicing the cooked stack into sliced pieces having a thickness of about 1 mm to about 100 mm; (l) attaching two or more of the sliced pieces on an end-to-end basis; and (m) rinsing, scrub washing, and drying the attached sliced pieces to provide the foam cushion.

The present invention also provides for a foam cushion formed from any one or more of the methods disclosed herein above.

The present invention also provides for the use of a foam cushion as disclosed herein above for medical devices, footwear, orthopedic footwear, orthopedic inserts for footwear, upholstery padding for land vehicles, upholstery padding for air vehicles, upholstery padding for water vehicles, back and buttock cushions for use in wheelchairs, back and buttock cushions for use in scooters, back and buttock cushions for use in power chairs, insulation products, acoustical resistant products, thermal resistant products, electrical resistant products, electrical conductive products, vibrational resistant products, floor mat, exercise floor mat, seat padding, wall padding, padding for impact protection, flooring, flooring underlayments, siding, fencing, mattress pads, pillows, cushioning for furniture, cushioning for seat cushions, carpet underpadding, roofing, cushioning and padding material for medical treatment, cushion inserts for pipes, cushion inserts for tubes, cushion inserts for hoses, pads for floor polishing machines, cushion inserts for medical devices, padding for computer equipment, recoil cushions used in firearms, paper padding, weather stripping, cushion padding made for saddlery, cushion pads for pets, cushion bags, padded cushion for use with a shoulder or neck strap on baby carriers, mattress pads, hand grips, hand cushions, pads for use in sporting equipment, pads for protective use in sporting, sporting equipment, a sporting device, or a combination thereof.

DETAILED OF THE INVENTION

Rubber

As used herein, "rubber" refers to (a): an elastic substance that is obtained by coagulating the milky juice of any of various tropical plants (as of the genera Hevea and Ficus), is essentially a polymer of isoprene, and is prepared as sheets and then dried; (b): any of various synthetic rubber-like substances; or (c): natural or synthetic rubber modified by chemical treatment to increase its useful properties (as toughness and resistance to wear). See, Merriam-Webster Online Dictionary, http://www.m-w.com.

As used herein, "synthetic rubber" refers to a flexible chain polymer with the ability to deform elastically when vulcanized or cured. Suitable synthetic rubbers include, e.g., a polybutadiene rubber (BR); a polyisoprene rubber (IR); a styrene-butadiene rubber (SBR); a nitrile rubber (NBR); a butyl rubber (IIR); an ethylene-propylene terpolymer (EPDM); a silicone rubber; a neoprene rubber; a polysulfide; a polyacrylate rubber; an epichlorohydrin rubber; a fluoroelastomer (FDM); a chloronated polyethylene (CSM); a halogenated butyl or bromobutyl (BIIR); a chlorinated polyethylene rubber (CPE); a polyurethane; a thermoplastic rubber; chlorinated natural rubber, cyclized rubber; and combinations thereof.

As used herein, "natural rubber" refers to cis-1,4-polyisoprene, which occurs naturally in over 200 species of plants, including dandeloins and goldenrod. Specifically, natural rubber (NR) can be obtained from the *Hevea brasiliensis* tree, the guayule bush *Parthenoim argentatum*, or the Sapotaceae tree.

Natural rubber can have different grades, e.g., latex grade or remilled grade. The latex grade natural rubber (NR) includes, e.g., ribbed smoked sheet (RSS), white and pale crepes, and pure blanket crepes. The remilled grade natural rubber (NR) includes, e.g., estate brown crepes, estate compo crepes, thin brown crepes or remils, thick brown crepes or ambers, and flat bark crepes. The natural rubber (NR) can be a technically-specified natural rubber (TSR), a superior processing natural rubber (SP), a technically classified natural rubber (TC), an air-dried sheet natural rubber (ADS), a skin natural rubber, a deproteinized natural rubber (DPNR), an oil-extended natural rubber (OENR), a hevealplus MG natural rubber, or an epoxidized natural rubber.

The natural rubber (NR) can include cis-polyisoprene, trans-polyisoprene, or a combination of cis- and trans-polyisoprene. Additionally, the natural rubber (NR) can include any suitable amount of polyisoprene, e.g., about 93 wt. % to about 95 wt. % of polyisoprene.

The rubber can be employed in the foam cushion in any appropriate and suitable amount. For example, the rubber can be employed up to about 99 wt. % of the foam cushion, up to about 95 wt. % of the foam cushion, or up to about 90 wt. % of the foam cushion. Typically, the rubber can be employed up to about 80 wt. % of the foam cushion, in about 5 wt. % to about 12 wt. % of the foam cushion, or in about 7 wt. % to about 9 wt. % of the foam cushion.

Resin

As used herein, "resin" refers to a semisolid or solid, complex, amorphous mixture of organic compounds; having no definite melting point and no tendency to crystallize. Resins may be of vegetable origin, of animal origin, or synthetic origin. See, e.g., *Concise Chemical and Technical Dictionary*, Fourth Enlarged Edition, Bennet, Chemical Publishing Co., NY, N.Y. (1986). The resin can be colorless or can be colored. The synthetic resins, originally viewed as substitutes for certain natural resins, have a large place of their own in industry and commerce. Phenol-formaldehyde, phenol-urea, and phenol-melamine resins are important commercially. Any unplasticized organic polymer is considered a resin, thus nearly any one of the common plastics may be viewed as a synthetic resin. See, *McGraw-Hill Concise Encyclopedia of Science & Technology*, Fourth Edition, Parker, Mc-Graw Hill (1998).

Specifically, the resin can be a thermoplastic polymer, a thermoplastic terpolymer, a thermoplastic homopolymer, a thermoplastic copolymer, or a combination thereof. Specifically, the thermoplastic copolymer can include an ethylene vinyl acetate (EVA), an ethylene propylene rubber, an ethylene methyl acrylate copolymer, an ethylene ethyl acrylate copolymer, an ethylene butyl acrylate copolymer, a polybutylene terephthalate (PBT) polymer, or a combination thereof. Specifically, the thermoplastic homopolymer can include a polyethylene, a chlorinated polyethylene, a metallocene polyethylene, a polypropylene, or a combination thereof. Specifically, the thermoplastic terpolymer can include a modified ethylene acrylate carbon monoxide terpolymer.

Specifically, the resin can be an ethylene vinyl acetate (EVA) copolymer. Commercially available EVA copolymers include, e.g., AT Polymers 1070C. (9% VA), AT Polymers 1710 (17% VA), AT Polymers 2306 (23% VA), AT Polymers 2803 (28% VA), AT Polymers 2810 (28% VA), Chevron/Ace Plastics TD 3401 (9.5% VA), Chevron/Ace Plastics DS 4089-70 (18% VA), DuPont Elvax® 40 (40% VA), DuPont Elvax® 140-W (33% VA), DuPont Elvax® 250-W (28% VA), DuPont Elvax® 260 (28% VA), DuPont Elvax® 350 (25% VA), DuPont Elvax® 360 (25% VA), DuPont Elvax® 450 (18% VA), DuPont Elvax® 460 (18% VA), DuPont Elvax® 550 (15% VA), DuPont Elvax® 560 (15% VA), DuPont Elvax® 650 (12% VA), DuPont Elvax® 660 (12% VA), DuPont Elvax® 750 (9% VA), DuPont Elvax® 760 (9.3% VA), DuPont Elvax® 770 (9.5% VA), Exxon Escorene® LD-740 (24.5% VA), Exxon Escorene® LD-724 (18% VA), Exxon Escorene® LD-721.62 (19.3% VA), Exxon Escorene® LD-721.88 (19.3% VA), Exxon Escorene® LD-721 (19.3% VA), Exxon Escorene® LD-740 (24.5% VA), Exxon Escorene® LD-318 (9% VA), Exxon Escorene® LD-319.92 (9% VA), Exxon Escorene® LD-725, Quantum UE 630-000 (17% VA), Quantum 637-000 (9% VA), Rexene® X1903 (10% VA), Rexene® X0901 (12% VA), Rexene® X0911 (18% VA), and Rexene® X0915 (9% VA).

Elvax® resins are a family of ethylene/vinyl acetate copolymers and are commercially available from DuPont (Wilmington, Del.).

Another class of suitable resins include, e.g., polyolefinic polymers. The polyolefinic polymer can include a low density polyethylene (LDPE), a very low density polyethylene (VLDPE), a linear low density polyethylene (LLDPE), a single site initiated polyethylene (e.g., PE, LDPE, or VLDPE), a polypropylene, a single-site initiated polypropylene, an ethylene-propylene diene monomer (EPDM) copolymer, an ethylene-propylene rubber (EPR), a single-site initiated ethylene-propylene diene monomer copolymer, a single-site initiated ethylene-propylene rubber, a high density polyethylene (HDPE), a polystyrene, a styrene copolymer, an ethylene-styrene interpolymer, a polyacrylonitrile, a polybutadiene, a polyvinylchloride (PVC), a polyvinylidene chloride, a polyvinylfluoride, a polyvinylidene fluoride, a polyvinyl acetate, a polyvinyl alcohol, a polyamide, a polyacrylate (e.g., a polymethyl acrylate or a polymethyl methacrylate), a polyether sulfone, a polysulfone, a polychlorotrifluoroethylene, a polytetrafluoroethylene, a cellulose, a polyester, a polyhalocarbon, and copolymers of ethylene with propylene, isobutene, butene, hexene, octene, vinyl chloride, vinyl propionate, vinyl isobutyrate, vinyl alcohol, allyl alcohol, allyl acetate, allyl acetone, allyl benzene, allyl ether, maleic anhydride, ethyl acrylate (EEA), methyl acrylate, acrylic acid, or methacrylic acid; and blends or alloys thereof.

LDPE resins are disclosed, e.g., in *Petrothene Polyolefins . . . A Processing Guide*, Fifth Edition, Quantum USI Division, 1986, pages 6–16. Some LDPE resins are commercially available, e.g., from Exxon Chemical Company (Houston, Tex.), Dow Plastics (Midland, Minn.), Novacor Chemicals (Canada) Limited (Mississauga, Ontario, Canada), Mobil Polymers (Norwalk, Conn.), Rexene Products Company (Dallas, Tex.), Quantum Chemical Company (Cincinnati, Ohio), and Westlake Polymers Corporation (Houston, Tex.). Commercially available LDPE resins include Eastman 1924P, Eastman 1550F, Eastman 800A, Exxon LD 117.08, Exxon LD 113.09, Dow 5351, Dow 683, Dow 760C, Dow 768I, Dow 537I, Novacor LF219A, Novacor LC05173, Novacor LCO522A, Mobil LIA-003, Mobil LFA-003, Rexene 2018 (7018), Rexene 1023, Rexene XO 875, Rexene PE5050, Rexene PE1076, Rexene PE2030, Quantum NA953, Quantum NA951, Quantum NA285-003, Quantum NA271-009, Quantum NA324, Westlake EF606AA, Westlake EF612, and Westlake EF412AA. A commercially available VLDPE is Union Carbide 1085.

Some EPR and EPDM resins are available commercially, e.g., from Exxon Chemical Company (Houston, Tex.), under the tradename Vistalon®, and include Vistalon® 5800, Vistalon® if 6205, Vistalon® 7000, Vistalon® 7500, Vistalon® 8000, Vistalon® 2200, Vistalon® 2504, Vistalon® 2555, Vistalon® 2727, Vistalon® 4608, Vistalon® 719, Vistalon® 3708, Vistalon® 404, Vistalon® 457, Vistalon® 503, Vistalon® 707, and Vistalon® 878. Other EPDM resins are available commercially from DuPont (Wilmington, Del.), under the tradename Nordel® and include Nordel® 2522, Nordel® 2722, Nordel® 1440, Nordel® 1470, Nordel® 1145, Nordel® 1040, and Nordel® 1070.

Single-site initiated polyolefin resins are described, e.g., in S. -Y. Lai, et al., U.S. Pat. Nos. 5,272,236, 5,278,272, and 5,380,810; in L. Spenadel, et al., U.S. Pat. No. 5,246,783; in C. R. Davey, et al., U.S. Pat. No. 5,322,728; in W. J. Hodgson, Jr., U.S. Pat. No. 5,206,075; and in F. C. Stehling, et al., WO 90/03414. Some single-site initiated polyolefin resins are available commercially, e.g., from Exxon Chemical Company (Houston, Tex.), under the tradename Exact®, and include Exact® 3022, Exact® 3024, Exact® 3025, Exact® 3027, Exact® 3028, Exact® 3031, Exact® 3034, Exact® 3035, Exact® 3037, Exact® 4003, Exact® 4024, Exact® 4041, Exact® 4049, Exact® 4050, Exact® 4051, Exact® 5008, and Exact® 8002. Other single-site initiated resins are available commercially, e.g., from Dow Plastics (Midland, Mich.) (or DuPont/Dow), under the tradenames Engage® and Affinity®, and include CL8001, CL8002, EG8100, EG8150, PL1840, PL1845 (or DuPont/Dow 8445), EG8200, EG8180, GF1550, KC8852, FW1650, PL1880, HF1030, PT1409, CL8003, Dow 8452, Dow 1030, Dow 8950, Dow 8190, and D8130 (or XU583-00-01).

Another suitable class of resins includes Elvaloy® AC acrylate copolymers, which are commercially available from DuPont (Wilmington, Del.). Elvaloy® AC acrylate copolymer resins are advertised as temperature resistant, noncorrosive, and low odor producing resins that can withstand high-heat processes without thermal degradation. Elvaloy® AC acrylate copolymer resins are also advertised as highly compatible with LDPE, and easily bond to various polar and nonpolar substrates such as PE, PET, OPP, and OPA.

Another suitable class of resins include, e.g., AquaStik® Polychloroprene Latex, Arcal® Styrene Allyl Alcohol, ASR Plus® Styrene Acrylic Emulsion, Bakelite® Phenolic Resin, Capcure® Epoxy Hardener/Accelerator, Chlorub® Chlorinated Rubber, Cycloaliphatic Epoxy Resin, CYRACURE® U.V.R. & U.V.I. Resins, Derakane® Vinyl Ester Resin, D.E.H.® Epoxy Hardener, D.E.N.® Epoxy Novolac, D.E.R.® Epoxy Resin, Duraplus 2® Styrene Acrylic Emulsion, Eastoflex® Amorphous Polyolefin, Elvanol® Polyvinyl Alcohol, Elvax® Ethylene Vinyl Acetate, G-Cryl® Acrylic Resin, Genamid® Amidoamine Resin, Indopol® Polybutene, Kraton® Thermoplasitic Elastomer, Maincote® Styrene Acrylic Emulsion, Modaflow® Powder 2000/III, Modaflow® Resin/2100, Modaflow® AQ-3000, Multiflow® Flow Modifier, Neoprene® Neoprene Latex®, Paraloid® Acrylic Resin, Photomer® Radiation Curing Chemicals, Polyco® Vinyl Acetate/Acrylic Emulsion, Polycup®, Delsette®, Hercosett®, Kymene®, Primal® Acrylic Emulsion, Rhoplex® Acrylic Emulsion, RoBond® Acrylic Emulsion, RoShield® Acrylic Emulsion, Rovace® Vinyl Acetate/Acrylic Emulsion, Stadex® Dextrin, Staley® Starch Derivatives, TONE® Caprolactone Polymer, UCAR® Solution Vinyl Resin, Versamid® Polyamide Resin, Versamine® Modified Amine, Waterpoxy®, C5 Aliphatic Resins, C9/D.C.P.D. Aromatic Resins, Adtac LV®, Aliphatic/Aromatic Mix Resins, Aliphatic Terpene Resins, Endex®, Hercolite®, Hercotac®, Hydrogenated Water White Resins, Kristalex®, Picco®, Piccodiene® 2215, Piccopale®, Piccolastic®, Piccolyte®, Piccotac®, Piccotex®, Piccovar®, Pure Monomer Aromatic Resins, Regalite®, and Regalrez®.

The resin can be employed in combination with the rubber. Alternatively, the resin can be employed in the absence of any rubber present or the rubber can be employed in the absence of any resin present.

The resin can be employed in any suitable and appropriate amount. For example, the resin can be employed up to about 99 wt. % of the foam cushion, up to about 95 wt. % of the foam cushion, or up to about 90 wt. % of the foam cushion. Typically, the resin can be employed in about 79 wt. % to about 83 wt. % of the foam cushion or in about 80.5 wt. % to about 82.5 wt. % of the foam cushion.

A specific suitable resin useful in the present invention includes, e.g., an ethylene-vinyl acetate (EVA) copolymer. The ethylene-vinyl acetate (EVA) copolymer can include any suitable and appropriate amount of vinyl acetate. Typically, the ethylene-vinyl acetate (EVA) copolymer can include about 15 wt. % to about 75 wt. % vinyl acetate.

When an ethylene-vinyl acetate (EVA) copolymer is employed as the resin, it can be employed in any suitable and appropriate amount. For example, the ethylene-vinyl acetate (EVA) copolymer can be employed up to about 99 wt. % of the foam cushion, up to about 95 wt. % of the foam cushion, or up to about 90 wt. % of the foam cushion.

Blowing Agent

As used herein, a "blowing agent" or "foaming agent" refers to a substance which, when heated, decomposes to form a gas. See, e.g., *Concise Chemical and Technical Dictionary*, Fourth Enlarged Edition, Bennet, Chemical Publishing Co., NY, N.Y. (1986). The Foaming agent will decompose at elevated temperatures to form one or more gasses. Foaming agents can be used to expand the compositions into a foam. In general, the foaming agent will have a decomposition temperature (with the resulting liberation of gaseous material) from about 130° C. to about 350° C. The blowing agent can be a liquid, gas, or solid at standard temperature and pressure. Foaming agents are included in the mixture to produce foamed articles. Foaming agents are medium expanding compositions that are gases at temperatures and pressures encountered during the foam expanding step. Typically, a foaming agent is introduced in the gaseous or liquid state and expands, for example, upon a rapid decrease in pressure.

Any suitable blowing agent can be employed, provided the blowing agent effectively decomposes, when heated, to form a gas and can expand a composition into a foam.

Suitable classes of blowing agents include, e.g., ($C_1$–$C_{12}$) hydrocarbons, ($C_1$–$C_{12}$)organohalogens, ($C_1$–$C_{12}$)alcohols, ($C_1$–$C_{12}$)ethers, ($C_1$–$C_{12}$)esters, ($C_1$–$C_{12}$)amines, or combinations thereof. Suitable ($C_1$–$C_{12}$)hydrocarbons include, e.g., acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, hexadiene, and combinations thereof.

Other suitable specific blowing agents include, e.g., sodium bicarbonate, ammonia, nitrogen, carbon dioxide, neon, helium, butane, isobutane, 1,1-difluoroethane, p,p'-oxybis(benzene)sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, acetone, azodicarbonamide (AC), dinitroso pentamethylene tetramine (DNPT), and combinations thereof.

Additional suitable foaming agents include, e.g., Formacel® Z-2, Porofor®, Genitron®, Ficel®, Planagen®, HFC-245fa, Meforex® 134a, Meforex® 134b, HFC-365mfc, azodicarbonamide, acetone, Dinitrosopentamethylene tetramine, Exxsol® 1200, Exxsol® 1550, Exxsol® 1600, Exxsol® 2000, Exxsol® HP 95, Freon® R-22 (HCFC), R-11 (CFC), R-12 (CFC), R-113 (CFC), R-141 (HCFC), R-22 (HCFC), R-HFC134a, and HFC-134a.

Additional suitable foaming agents include, e.g., SUVA® (DuPont), Dymel® (DuPont), Formacel® (DuPont), Zyron® (DuPont), Porofor® (Bayer), Genitron® (Bayer), Ficel® (Bayer), Planagen® (Bayer), Meforex® 134a (Ausimont), Meforex® 141b (Ausimont), HFC-245fa (Ausimont), HFC-365mfc (Ausimont), acetone, Exxsol® 1200 (Exxon Mobil), Exxsol® 1550 (Exxon Mobil), Exxsol® 1600 (Exxon Mobil), Exxsol® 2000 (Exxon Mobil), Exxsol® HP 95 (Exxon Mobil), Freon® R-22 (HCFC) (Foam-Tech), Freon® R-11 (CFC) (Foam-Tech), and HFC-Freon® 134a (Foam-Tech).

Other suitable blowing agents are disclosed, e.g., in Aldrich Handbook of Fine Chemicals (Milwaukee, Wis.).

Specifically, the blowing agent can be azodicarbonamide (AC), which is chemically designated as $H_2NC(=O)N=NC(=O)NH_2$.

The blowing agent can be employed in any suitable and appropriate amount. For example, the blowing agent can be employed up to about 50 wt. % of the foam cushion, up to about 40 wt. % of the foam cushion, or up to about 30 wt. % of the foam cushion. Typically, the blowing agent can be employed in about 0.1 wt. % of the foam cushion to about 10 wt. % of the foam cushion, in about 3.0 wt. % of the foam cushion to about 4.2 wt. % of the foam cushion, or in about 3.5 wt. % to about 4.0 wt. % of the foam cushion.

Polymeric Adhesion Modifier

As used herein, a "polymeric adhesion modifier" or "bonding polymer" refers to a material to help bond together polymers used in toughened, filled, and blended compounds.

Any suitable and appropriate polymeric adhesion modifier can be employed. Suitable classes of polymeric adhesion modifiers include, e.g., anhydride grafted polyolefin resins, styrene maleic anhydride (SMA) copolymers, and combinations thereof. Specifically, the anhydride can be maleic anhydride. Specifically, the polyolefin can be polyethylene, polypropylene, EPDM, ethylene vinyl acetate (EVA), a copolymer thereof, or a combination thereof.

Specifically, the polymeric adhesion modifier can be a FUSABOND polymeric adhesion modifier. Specific suitable FUSABONDs include, e.g., FUSABOND P modified proplylene, FUSABOND E modified polyethylene, FUSABOND C modified ethylene vinyl acetate, FUSABOND A modified ethylene-acrylate terpolymer, FUSABOND N modified ethylene-based rubber, and combinations thereof.

Fusabond® resins are modified polymers that have been functionalized (typically by maleic anhydride grafting) to help bond together polymers used in toughened, filled and blended compounds. The Fusabond® resins are commercially available from DuPont (Wilmington, Del.). The Fusabond® resins include modified ethylene acrylate carbon monoxide terpolymers, ethylene vinyl acetates (EVAs), polyethylene, metallocene polyeythylenes, ethylene propylene rubbers, and polypropylenes.

The polymeric adhesion modifier can be employed in any suitable and appropriate amount. For example, the polymeric adhesion modifier can be employed up to about 30 wt. % of the foam cushion, up to about 20 wt. % of the foam cushion, or up to about 10 wt. % of the foam cushion. Typically, the polymeric adhesion modifier can be employed in about 0.5 wt. % of the foam cushion to about 15 wt. % of the foam cushion, in about 2.8 wt. % of the foam cushion to about 3.9 wt. % of the foam cushion, or in about 3.0 wt. % of the foam cushion to about 3.5 wt. % of the foam cushion.

Cross-Linking Agent

The cross-linking agent can be a free radical source. As used herein, a "free radical source" refers to cross-linking with a peroxide. "Peroxide" refers to an organic compound that includes one or more peroxide, i.e., O—O, linkages. Suitable peroxides are disclosed, e.g., in *Aldrich Catalogue of Fine Chemicals* (Milwaukee, Wis.). Heating the peroxide causes it to generate radicals which react with the components of the mixture to cause covalent cross-links in the mixture. By regulating the amounts and types of organic peroxide present in the mixture, the relative rates of radical generation, abstraction, and cross-linking steps can be controlled to permit foaming of the polymeric adhesion materials. The resulting materials have high crosslink levels. Peroxide cross-linking is described, e.g., in Park, *Handbook of Polymeric Foam and Foam Technology*, Polyolefin Foam, Ch. 9, pp. 186–242.

The cross-linking can alternatively occur with high-energy, ionizing radiation, which involves the use of equipment that generates electrons, X-rays, Beta-rays or Gamma-rays. A preferred method for cross-linking olefinic compositions through exposure to ionizing radiation is through the use of an electron-beam radiation source. Exposure of the compositions of the present invention to ionizing radiation may be accomplished at dosages in the range of about 0.1 to 40 Megarads, and preferably, at about 1 to 20 Megarads. U.S. Pat. No. 4,203,815 (Noda) discloses methods of exposing compositions to both high and low-energy ionizing radiation to effect improvements in surface quality, strength and subsequent heat-sealing or embossing processes. The amount of cross-linking may be appropriately controlled by the dosage of ionizing radiation.

The cross-linking agent (i.e., graft initiator) can be a radical generating species, for example, a peroxide. Examples of peroxides include methylethylketone peroxide; dicumyl peroxide; 2,5-dimethyl-2,5-di(t-butylperoxy) hexane; 1,1-bis(t-butylperoxy)-3,3,5-trimethylcyclohexane; 1,1-di-(t-butylperoxy)cyclohexane; 2,2'-bis(t-butylperoxy) diisopropylbenzene; 4,4'-bis(t-butylperoxy)butylvalerate; Ethyl 3,3-bis(t-butylperoxy) butyrate; t-butyl cumyl peroxide; Di [(t-butylperoxy)-isopropyl] benzene; t-butyl peroxide; 6,6,9,9-tetramethyl-3-methyl-3, n-butyl-1,2,4,5-tetraoxycyclononane; 6,6,9,9-tetramethyl-3-methyl-3-ethyl arbonylmethyl 1,2,4,5-tetraoxy-cyclononane; ethyl 3,3-di (t-butylperoxy)-butyrate; dibenzoyl peroxide; 2,4-dichlorobenzoyl peroxide; OO-t-butyl O-(2-ethylhexyl) mono peroxycarbonate; t-butyl cumyl peroxide; 2,5-dimethyl-2,5-di-(t-butylperoxy)hexyne-3; and combinations thereof. Specifically, the graft initiator can be dicumyl peroxide, such as 40% active dicumyl peroxide (e.g., Luperco® 500 40KE).

The cross-linking agent can be employed in any suitable and appropriate amount. Typically, the cross-linking agent can be employed in about 0.1 wt. % of the foam cushion to about 2.0 wt. % of the foam cushion, in about 0.5 wt. % of the foam cushion to about 0.9 wt. % of the foam cushion, or in about 0.6 wt. % of the foam cushion to about 0.7 wt. % of the foam cushion.

Decomposition Accelerating Agent

As used herein, a "decomposition accelerating agent" refers to a chemical or combination of chemicals that accelerates decomposition and free radical generation of the free radical source.

Any suitable and appropriate decomposition accelerating agent can be employed, provided the decomposition accelerating agent can effectively accelerate the reaction without causing premature gellation.

Suitable classes of decomposition accelerating agent include inorganic salts, lead-containing compounds, metallic soaps, urea compounds, and $R^1COOR^2$, wherein: $R^1$ is $(C_1-C_{20})$alkyl, $(C_2-C_{20})$alkenyl, $(C_1-C_{20})$alkynyl, aryl $(C_1-C_{20})$alkyl, aryl $(C_2-C_{20})$alkenyl, aryl$(C_2-C_{20})$alkynyl, cycloalkyl$(C_1-C_{20})$alkyl, cycloalkyl$(C_2-C_{20})$alkenyl, or cycloalkyl$(C_2-C_{20})$alkynyl; and $R^2$ is hydrogen, $(C_1-C_{20})$ alkyl, $(C_2-C_{20})$alkenyl, $(C_1-C_{20})$alkynyl, aryl$(C_1-C_{20})$ alkyl, aryl $(C_2-C_{20})$alkenyl, aryl$(C_2-C_{20})$alkynyl, cycloalkyl$(C_1-C_{20})$alkyl, cycloalkyl$(C_2-C_{20})$alkenyl, or cycloalkyl$(C_2-C_{20})$alkynyl; wherein any alkyl, alkenyl, alkynyl, cycloalkyl, or aryl is optionally substituted on carbon with one or more halo, nitro, cyano, $(C_1-C_{20})$alkoxy, or trifluoromethyl; or pharmaceutically acceptable salts thereof.

Specifically, the decomposition accelerating agent can be an inorganic salt.

As used herein, an "inorganic salt" refers to a compound, that does not include any carbon atoms, that is the product resulting from the reaction of an acid and a base, e.g., sodium chloride. Any suitable inorganic salt can be employed and are disclosed, e.g., in *Aldrich Catalogue of Fine Chemicals* (Milwaukee, Wis.).

Specifically, the decomposition accelerating agent can be a carboxylic acid.

As used herein, a "carboxylic acid" refers to a compound that includes one or more C(=O)OH functional groups. Any suitable carboxylic acid can be employed and are disclosed, e.g., in *Aldrich Catalogue of Fine Chemicals* (Milwaukee, Wis.).

Specifically, the decomposition accelerating agent can be a combination of an inorganic salt and a carboxylic acid.

Specifically, the decomposition accelerating agent can be zinc oxide, tribasic lead sulfate, zinc stearate, lead stearate, CELLPASTE-K5, stearic acid, or a combination thereof.

Specifically, the decomposition accelerating agent can be zinc oxide and stearic acid.

The decomposition accelerating agent can be employed in any suitable and appropriate amount. For example, the decomposition accelerating agent can be employed up to about 40 wt. %, up to 35 wt. %, or up to 30 wt. % of the foam cushion. Typically, the decomposition accelerating agent can be employed up to about 25 wt. % of the foam cushion, in about 1.5 wt. % to about 13.5 wt. % of the foam cushion, or in about 2.0 wt. % to about 13.0 wt. % of the foam cushion.

Cross-Linking Agent

As used herein, a "cross-linking agent" refers to a compound that increases the ability of one or more branched or straight-chained molecules to form one or more valence bridges between them. See, e.g., *Concise Chemical and Technical Dictionary*, Fourth Enlarged Edition, Bennet, Chemical Publishing Co., NY, N.Y. (1986). Cross-linking of a polymeric mixture can aid in the formation of desirable foamed and non-foamed materials. Cross-linking can also lead to improvements of the ultimate physical properties of the materials (e.g., foam cushion), such as flexibility and low tackiness. Cross-linking can take place prior to, during, or after expansion of the foam.

Cross-linking can be accomplished by grafting vinyl silane groups onto a component of the mixture and activating cross-linking by exposing the mixture to moisture. Silane crosslinking can be useful for making thin gauge foamed articles such as tape grade foams. A combination of peroxide and silane cross-linking can also be used. In the case of peroxide, the cross-linking can be accomplished in the beginning zones of a foaming chamber via heat activation or in another heat treatment process. Silane cross-linking can be activated by exposure to a source of moisture, for example, prior to expansion in an oven. Suitable vinyl silanes include, vinyltrimethoxy silane, vinyltris (methylethylketoxime) silane.

Another class of suitable cross-linking agents includes, e.g., alkoxy silanes (e.g., methyltrimethoxy silane, dimethyldimethoxy silane, phenyltrimethoxy silane, diphenyldimethoxy silane, methyltriethoxy silane, dimethyl diethoxy silane, phenyl triethoxy silane, or diphenyl diethoxy silane), oximesilanes (e.g., methyltris (methylethylketoxime) silane, dimethylbis (methylethylketoxime) silane, phenyltris (methylethylketoxime) silane, or diphenylbis (methylethylketoxime) silane). These cross-linking agents can be used individually or in a mixture of two or more.

Another suitable class of cross-linking agents includes, e.g., ($C_3$–$C_{10}$)alkylene diols and ($C_3$–$C_{10}$)cycloalkylene diols. Examples of ($C_3$–$C_{10}$)alkylene diols are 1,3-propanediol, 1,4-butanediol 1,6-hexanediol, 2-ethyl-1,3-hexanediol, 2,2,4-trimethyl-1,3-pentanediol and 2-butyl-2-ethyl-1,3-propanediol.

Additional suitable cross-linking agents includes, e.g., hydroquinone di(beta-hydroxyl ethyl)ether, ethoxylated bisphenol A, 4,4'-methylene bis(2-chloroaniline), 4,4'-methylenebis(3-chloro-2,6-diethylaniline), 3,5-dimethylthio-2,4-toluenediamine, 3,5-dimethylthio-2,6-toluenediamine, trimethylene glycol di-p-aminobenzoate and 1,4-bis(beta-hydroxyethoxy) benzene.

Additional suitable specific cross-linking agents include, e.g., ethyleneglycol di(meth)acrylate; diethyleneglycol di(meth)acrylate; triallyl cyanurate (TAC); triallyl isocyanurate (TAIC), triallyl phosphate (TAPA), trimethylol propane trimethacrylate; allyl methacrylate; or a combination thereof.

Suitable specific oximesilanes include, e.g., methyltris (methylethylketoxime) silane, dimethylbis (methylethylketoxime) silane, phenyltris (methylethylketoxime) silane, vinyltris (methylethylketoxime) silane, diphenylbis (methylethylketoxime) silane, and combinations thereof.

Optional Components

Any one or more of a cure retarder, a reinforcing agent, a filler, an extender, a placticizer, a vulcanization agent, an antioxidant, a fire retardant, a colorant, an electrically conductive material, and a stabilizer can be employed in the present invention in the process of manufacturing a foam cushion.

As used herein, a "cure retarder" refers to a substance that slows the process for a polymer or polymeric-containing substance to cure. Curing refers to the time necessary for a polymeric substance to complete reaction so that it becomes infusible and chemically inert. Cure refers to the change in physical properties of a material by chemical reaction, which may be condensation, polymerization, or vulcanization; usually accomplished by the action of heat and catalysts; alone or in combination, with or without pressure. See, e.g., *Concise Chemical and Technical Dictionary*, Fourth Enlarged Edition, Bennet, Chemical Publishing Co., NY, N.Y. (1986). Retarders are chemicals that prevent the premature vulcanization of rubber compounds during mixing, caldering, and other processing steps. In the absence of the processing safety provided by retarders, scorched stocks, and consequently, waste results either during the processing steps or during the storage of the fully compounded green stocks. Retarders are often called antiscorching agents, scorch inhibitors, cure retarders, or prevulcanization inhibitors, whereas such conventional retarders as salicyclic acid, phthalic anhydride, and N-nitrosodiphenylamine (NDPA) are simply called retarders.

Conventional cure retarders include benzoic acid, phthalic anhydride, and NDPA. More recent ones include a sulfonamide derivative Vulkalent® E (Mobay) and N-(cyclohexylthio)phthalimide (CTP), Santogard® PVI and AK-8169 (Monsanto).

As used herein, a "reinforcing agent" refers to a substance that imparts strength, toughness, and a greater resistance to wear. See, e.g., *Concise Chemical and Technical Dictionary*, Fourth Enlarged Edition, Bennet, Chemical Publishing Co., NY, N.Y. (1986).

As used herein, a "filler" refers to a substance that tends to convert rubber or a polymeric material from an elastic to a ridged state, even at low concentrations, and substantially increases resistance to abrasion and tear. See, e.g., *Concise Chemical and Technical Dictionary*, Fourth Enlarged Edition, Bennet, Chemical Publishing Co., NY, N.Y. (1986).

As used herein, an "extender" refers to an inert substance that used to provide added weight of bulk and lower costs. See, e.g., *Concise Chemical and Technical Dictionary*, Fourth Enlarged Edition, Bennet, Chemical Publishing Co., NY, N.Y. (1986).

As used herein, a "plasticizer" refers to a substance which is added to a plastic or polymeric material to soften, increase toughness, or otherwise modify the properties of the plastic or polymeric material. See, e.g., *Concise Chemical and Technical Dictionary*, Fourth Enlarged Edition, Bennet, Chemical Publishing Co., NY, N.Y. (1986).

As used herein, a "vulcanization agent" refers to a substance that aids or assist in the vulcanization process. Vulcanization refers to an irreversible process during which a rubber compound, through a change in its chemical structure (e.g., cross-linking) becomes less plastic and more resistant to swelling by organic liquids, and elastic properties are conferred, improved, or extended over a greater range of temperature. See, e.g., *Concise Chemical and Technical Dictionary*, Fourth Enlarged Edition, Bennet, Chemical Publishing Co., NY, N.Y. (1986).

As used herein, an "antioxidant" refers to a substance that prevents or slows down oxidation, e.g., phenyl naphthylamine. See, e.g., *Concise Chemical and Technical Dictionary*, Fourth Enlarged Edition, Bennet, Chemical Publishing Co., NY, N.Y. (1986).

As used herein, a "fire retarder" or "fire retardant" refers to a substance that retards fire, prevents or diminishes the ability of a substance from igniting, catching fire, and/or burning.

Suitable fire retardants are disclosed, e.g., in *Flame Retardants-Products Information*, Spartan Flame Retardants, Inc., 1983, pp. 1–17; *Flame retardants Buyers Guide*, American Dyestuff Reporter, January 1996, pp. 15–31; *Flame Retardants*-101,: *Basic Dynamics-Past Efforts Create Future Opportunities*, Fire Retardant Chemicals Association, Mar. 24–27, 1996, pp.1–220; *Phosphorous-Containing Polymers*, Enc. of Polymer Science and Engineering, vol. 11, 1998, pp. 96–111; *Phosphorous Flame Retardants*, Enc. of Chemical Tech., vol. 10, 1993, pp. 976–993; *Flame Retardants: Cool Under Fire*, Chemical Engineering, September 1995, vol. 102, No. 9, pp. 65–68; Fine Chemical, Vol. 20, No. 11 (1991) pp.9–36; Kirk-Othmer, "Phosporous Flame retardants", *Encyclopedia of Chemical Technology*, vol. 10, 1993, pp. 976–993; *Kirk-*

Othmer Encyclopedia of Chemical Technology, 4th ed., vol. 25, John Wiley & Sons, New York, 1998, pp. 627–664; Fire Retardant Chemical Association (FRCA) (http://www.arcat.com); International Resources (Columbus, Md.); Handbook of Flame Retardant Chemicals and Fire Testing Services, Russell C. Kidder, Technomic Publ. (1994); Fire Hazard Comparison of Fire-Retarded and Non-Fire-Retarded Products: Results of a Test Program Conducted by the Center for Fire Research for the Fire Retardant Chemicals Association, Publishing Company Technomic (Editor), Paperback-January 1988; Fire Retarded Polymer Applications, Kidder, Hardcover, January 1997; and Fire Safety through Use of Flame Retarded Polymers: Papers-Joint Meeting SPE and Fire Retardant Chemicals Association, Adam's Mark Hotel, Houston, Tex., Mar. 25–27, 1985;Society of Plastics Engineers Staff, Paperback/Books on Demand.

Suitable specific fire retardants include, e.g., phosphonium ammonium borate (i.e., phospho-ammonium boron); 3,4,5,6-dibemzo-1,2-oxaphosphane-2-oxide or 9,10-dihydro-9-oxa-10-phospaphenanthrene-10-oxide (OPC) [CAS Registry Number 35948-25-5]; sulfamic acid monoammonium salt (ammonium sulfamate) [CAS Registry Number 7773-06-0]; di-n-butyltin oxide (DBTO) [CAS Registry Number 818-08-6]; di-n-octyltin oxide (DOTO) [CAS Registry Number 780-08-6]; dibutyltin diacetate di-n-butyltin diacetate (NS-8) [CAS Registry Number 1067-33-0]; dibutyltin dilaurate di-n-butyltin dilaurate (Stann BL) [CAS Registry Number 77-58-7]; ferrocene; iron pentacarbonyl; ammonium sulfate; ammonium phosphate; zinc chloride; and combinations thereof.

As used herein, a "stabilizer" refers to a substance that when added to a plastic or polymeric material, will prevent or slow down the aging and weathering changes. See, e.g., Concise Chemical and Technical Dictionary, Fourth Enlarged Edition, Bennet, Chemical Publishing Co., NY, N.Y. (1986).

As used herein, an "electrically conductive material" or "electrical conductive material" refers to any substance that increases the electrical conductivity of the article of manufacture (e.g., foam cushion). Suitable electrically conductive materials include, e.g., metal containing substances.

Each of the cure retarder, a reinforcing agent, a filler, a colorant, an extender, a placticizer, a vulcanization agent, an antioxidant, a fire retardant, electrically conductive material, and a stabilizer can be employed in any suitable and appropriate amount. For example, any one or more of the cure retarder, a reinforcing agent, a filler, an extender, a placticizer, a vulcanization agent, an antioxidant, a fire retardant, and a stabilizer can be employed up to about 40 wt. % of the foam cushion, up to about 20 wt. % of the foam cushion, up to about 10 wt. % of the foam cushion, or up to about 1 wt. % of the foam cushion. Typically, any one or more of the cure retarder, a reinforcing agent, a filler, an extender, a placticizer, a vulcanization agent, an antioxidant, a fire retardant, and a stabilizer can be employed up to about 5 wt. % of the foam cushion, up to about 1 wt. % of the foam cushion, or up to about 0.5 wt. % of the foam cushion.

One specific foam cushion is formed from: (a) at least one of natural rubber and an ethylene-vinyl acetate (EVA) copolymer; (b) azodicarbonamide (AC); (c) FUSABOND; (d) dicumyl peroxide; and (e) a combination of zinc oxide and stearic acid.

Another specific foam cushion is formed from: (a) natural rubber employed in about 5 wt. % to about 12 wt. % of the foam cushion; (b) an ethylene-vinyl acetate (EVA) copolymer employed in about 79 wt. % to about 83 wt. % of the foam cushion; (c) azodicarbonamide (AC) employed in about 3 wt. % to about 4.2 wt. % of the foam cushion; (d) FUSABOND employed in into about 2.8 wt. % to about 3.9 wt. % of the foam cushion; (e) dicumyl peroxide employed in about 0.5 wt. % to about 0.9 wt. % of the foam cushion; and (f) a combination of zinc oxide and stearic acid, wherein the zinc oxide is employed in about 1.0 wt. % to about 2.2 wt. % of the foam cushion and stearic acid is employed in about 0.5 wt. % to about 1.25 wt. % of the foam cushion.

The article of manufacture (e.g., foam cushion) of the present invention can include one or more (e.g., up to about 100, up to about 50, or up to about 25) layers. Each of the layers can independently include the components (e.g., (a) at least one of rubber and a resin, (b) a blowing agent, (c) a polymeric adhesion modifier, (d) a decomposition accelerating agent, and (e) a cross-linking agent), as disclosed herein, for an article of manufacture (e.g., foam cushion). Specifically, any one or more layers can have different compositions from the other layers. For example, any one or more layers of the article of manufacture (e.g., foam cushion) can include (a) rubber, (b) a blowing agent, (c) a polymeric adhesion modifier, (d) a decomposition accelerating agent, and (e) a cross-linking agent; any one or more other layers can include (a) a resin, (b) a blowing agent, (c) a polymeric adhesion modifier, (d) a decomposition accelerating agent, and (e) a cross-linking agent; any one or more other layers can include (a) both rubber and a resin, (b) a blowing agent, (c) a polymeric adhesion modifier, (d) a decomposition accelerating agent, and (e) a cross-linking agent; and any one or more other layers can include (a) at least one of rubber and a resin, (b) a blowing agent, (c) a polymeric adhesion modifier, (d) a decomposition accelerating agent, (e) a cross-linking agent, and at least one of a cure retarder, a reinforcing agent, a filler, an extender, a placticizer, a vulcanization agent, an antioxidant, a fire retardant, an accelerator, a colorant, an electrically conductive material, and a stabilizer. Alternatively, each of the one or more layers can include the same components, in the about same amounts.

The article of manufacture (e.g., foam cushion) can optionally be laminated employing those materials, conditions, and methods known to those of skill in the art of lamination.

The article of manufacture (e.g., foam cushion) can optionally be elastic, elastomeric, stretchable, and/or biaxial stretchable.

As used herein, the term "elastic," or "elastomeric" refers to that property of a material where upon removal of an extending force, it is capable of substantially recovering its original size and shape and/or exhibits a significant retractive force.

As used herein, the term "stretch," or "stretchable" refers to a material that is either elastic or extensible. That is, the material is capable of being extended, deformed, or the like, without breaking, and may or may not significantly retract after removal of an extending force.

As used herein, the term "biaxial stretch" refers to a material having stretchability in two directions perpendicular to one another, e.g. stretchability in a machine direction and in a cross machine direction, or in a longitudinal direction (front to back) and a lateral direction (side to side).

The article of manufacture (e.g., foam cushion) disclosed herein can have a density or specific gravity greater than, equal to, or less than that of liquid water, at a specified temperature (e.g., 4° C.). Specifically, the article of manufacture (e.g., foam cushion) disclosed herein can have a density or specific gravity less than that of liquid water, at a specified temperature (e.g., 4° C.). For example, liquid water has a density of about 1.00 g/mL at about 4° C., a density of about 0.98 g/mL at about 65° C., a density of about 0.97 g/mL at about 83° C., and a density of about 0.96 g/mL at about 97° C. Additionally, the article of manufacture (e.g., foam cushion) can have a relative density of up to about 0.90 of liquid water, a relative density of up to about 0.80 of liquid water, a relative density of up to about 0.70 of liquid water, or a relative density of up to about 0.60 of liquid water. In one specific embodiment of the present invention, the article of manufacture (e.g., foam cushion) disclosed herein can float on water.

As used herein, "relative density" refers to the ratio of absolute density of a substance, expressed in grams per milliliter, to the absolute density of water at a given temperature, expressed in grams per milliliter.

Methods of Manufacturing the Foam Cushion

Each of the (a) rubber and/or resin; (b) a blowing agent; (c) a polymeric adhesion modifier; (d) cross-linking agent; and (e) decomposition accelerating agent; alone or in combination with the one or more optional components (e.g., cure retarder, a reinforcing agent, a filler, an extender, a placticizer, a vulcanization agent, an antioxidant, a fire retardant, a colorant, an electrically conductive material, and a stabilizer), can be combined, in any suitable and appropriate manner, in any suitable and appropriate order, and under any suitable and appropriate conditions, to effectively provide a foam cushion.

First Mixture

Rubber, a resin, a blowing agent, a polymeric adhesion modifier, and a decomposition accelerating agent, alone or in combination with the one or more optional components (e.g., cure retarder, a reinforcing agent, a filler, an extender, a placticizer, a vulcanization agent, an antioxidant, a fire retardant, a colorant, an electrically conductive material, and a stabilizer) can be mixed to form a first mixture. The rubber, resin, blowing agent, polymeric adhesion modifier, and decomposition accelerating agent, alone or in combination with the one or more optional components (e.g., cure retarder, a reinforcing agent, a filler, an extender, a placticizer, a vulcanization agent, an antioxidant, a fire retardant, a colorant, an electrically conductive material, and a stabilizer) can be mixed, in any order, to form the first mixture.

The rubber, resin, blowing agent, polymeric adhesion modifier, and decomposition accelerating agent, alone or in combination with the one or more optional components (e.g., cure retarder, a reinforcing agent, a filler, an extender, a placticizer, a vulcanization agent, an antioxidant, a fire retardant, a colorant, an electrically conductive material, and a stabilizer) can be mixed, under any suitable and appropriate conditions, to form the first mixture. For example, the rubber, resin, blowing agent, polymeric adhesion modifier, and decomposition accelerating agent, alone or in combination with the one or more optional components (e.g., cure retarder, a reinforcing agent, a filler, an extender, a placticizer, a vulcanization agent, an antioxidant, a fire retardant, a colorant, an electrically conductive material, and a stabilizer) can be mixed at any suitable and appropriate temperature. Specifically, the rubber, resin, blowing agent, polymeric adhesion modifier, and decomposition accelerating agent, alone or in combination with the one or more optional components (e.g., cure retarder, a reinforcing agent, a filler, an extender, a placticizer, a vulcanization agent, an antioxidant, a fire retardant, a colorant, an electrically conductive material, and a stabilizer) can be mixed at a temperature above about 0° C., above about 25° C., above about 50° C., above about 80° C., above about 100° C., or above about 150° C. More specifically, the rubber, resin, blowing agent, polymeric adhesion modifier, and decomposition accelerating agent, alone or in combination with the one or more optional components (e.g., cure retarder, a reinforcing agent, a filler, an extender, a placticizer, a vulcanization agent, an antioxidant, a fire retardant, a colorant, an electrically conductive material, and a stabilizer) can be mixed at about 80° C. to about 160° C., at about 100° C. to about 140° C., or at about 110° C. to about 130° C.

Additionally, the rubber, resin, blowing agent, polymeric adhesion modifier, and decomposition accelerating agent, alone or in combination with the one or more optional components (e.g., cure retarder, a reinforcing agent, a filler, an extender, a placticizer, a vulcanization agent, an antioxidant, a fire retardant, a colorant, an electrically conductive material, and a stabilizer) can be mixed for any suitable and appropriate period of time. For example, the rubber, resin, blowing agent, polymeric adhesion modifier, and decomposition accelerating agent, alone or in combination with the one or more optional components (e.g., cure retarder, a reinforcing agent, a filler, an extender, a placticizer, a vulcanization agent, an antioxidant, a fire retardant, a colorant, an electrically conductive material, and a stabilizer) can be mixed for more than about 1 minute, more than about 5 minutes, or more than about 10 minutes. Specifically, the rubber, resin, blowing agent, polymeric adhesion modifier, and decomposition accelerating agent, alone or in combination with the one or more optional components (e.g., cure retarder, a reinforcing agent, a filler, an extender, a placticizer, a vulcanization agent, an antioxidant, a fire retardant, a colorant, an electrically conductive material, and a stabilizer) can be mixed for about 8 minutes to about 20 minutes.

Specifically, rubber, a resin, a blowing agent, a polymeric adhesion modifier, and a decomposition accelerating agent are combined in any order and are mixed for about 8 minutes to about 20 minutes at about 110° C. to about 130° C. to form a first mixture. More specifically, rubber, a resin, a blowing agent, a polymeric adhesion modifier, and a decomposition accelerating agent are combined in any order and are mixed for about 8 minutes to about 20 minutes at about 110° C. to about 130° C. to form a first mixture. More specifically, natural rubber, an ethylene-vinyl acetate (EVA) copolymer, azodicarbonamide (AC), a FUSABOND, zinc oxide, and stearic acid are combined in any order and are mixed for about 8 minutes to about 20 minutes at about 110° C. to about 130° C. to form a first mixture.

Second Mixture

The first mixture and a cross-linking agent, alone or in combination with the one or more optional components (e.g., cure retarder, a reinforcing agent, a filler, an extender, a placticizer, a vulcanization agent, an antioxidant, a fire retardant, a colorant, an electrically conductive material, and a stabilizer), can be combined to effectively provide a second mixture. The first mixture and a cross-linking agent, alone or in combination with the one or more optional components (e.g., cure retarder, a reinforcing agent, a filler, an extender, a placticizer, a vulcanization agent, an antioxidant, a fire retardant, a colorant, an electrically conductive material, and a stabilizer), can be combined, in any suitable and appropriate manner, in any suitable and appropriate order, and under any suitable and appropriate conditions, to effectively provide a second mixture.

The second mixture can be mixed at any suitable and appropriate temperature. Specifically, the second mixture can be mixed at a temperature of above about 0° C., above about 25° C., above about 50° C., above about 75° C., or above about 100° C. More specifically, the second mixture can be mixed at a temperature of between about 100° C. and 140° C. or between about 110° C. and 130° C.

The second mixture can be mixed for any suitable and appropriate period of time. Specifically, the second mixture can be mixed for more than about 1 minute, for more than about 2 minutes, for more than about 5 minutes, or for more than about 10 minutes. More specifically, the second mixture can be mixed for a period of time between about 1 minute and about 8 minutes or for a period of time between about 2 minutes and about 4 minutes.

The second mixture can be spread to form one or more sheets. The second mixture can be spread, to form the one or more sheets, employing any suitable and appropriate method. The one or more sheets can have any suitable and appropriate size (i.e., length, width, and thickness). Specifically, the one or more sheets can have a length of more than about 1 ft., more than about 2 ft., or more than about 5 ft. Specifically, the one or more sheets can have a width of more than about 1 ft., more than about 2 ft., or more than about 5 ft. Specifically, each of the one or more sheets can have a thickness of between about 0.01 mm and about 1 cm., of between about 0.5 mm and about 50 mm, of between about 0.5 mm and about 20 mm, or of between about 1 mm and about 8 mm. The one or more sheets can have a combined thickness of more than about 0.25 inch, more than about 0.5 inch, or more than about 1 inch. Specifically, the one or more sheets can have a combined thickness of up to about 12 inches, up to about 6 inches, or up to about 4 inches. More specifically, the one or more sheets can have a combined thickness of between about 0.5 inch and about 10 inches or between about 1 inch and about 6 inches or between about 2 inches and about 6 inches.

Cooling

The one or more sheets can optionally be cooled. The one or more sheets can optionally be cooled in any suitable and appropriate manner to any suitable and appropriate temperature and for any suitable and appropriate period of time. Specifically, the one or more sheets can optionally be cooled to below about 100° C., to below about 80° C., to below about 75° C., or to below about 50° C. Specifically, the one or more sheets can be cooled for more than 10 seconds, for more than for 1 minute, or for more than 5 minutes.

Cutting

The one or more sheets can optionally be cut. The one or more sheets can optionally be cut in any suitable and appropriate manner (e.g., knife, razor, laser, etc.).

Stacking

The one or more sheets can be stacked, one on top of the other. Prior to stacking the one or more sheets, the one or more sheets can optionally be contacted with a non-stick substance. The non-stick substance can be applied to the one or more sheets in any suitable and appropriate manner, e.g., by dipping, spraying, brushing, etc. Additionally, the one or more sheets can be contacted with the non-stick substance at any portion or portions of the one or more sheets. Typically, those surfaces of the one or more sheets that will subsequently come into contact with any machinery can be contacted with the non-stick substance.

As used herein, a "non-stick substance" refers to any substance that can effectively prevent or decrease the likelihood that the one or more sheets will stick to a foreign object (e.g., machinery or press). Any suitable non-stick substance can be employed, provided the non-stick substance will effectively prevent or decrease the likelihood that the one or more sheets will stick to a foreign object (e.g., the machinery or press). Suitable non-stick substances include, e.g., silicone-containing compounds, oils, and waxes. Any suitable amount of non-stick substance can be employed, provided the amount of non-stick substance will effectively prevent or decrease the likelihood that the one or more sheets will stick to a foreign object (e.g., the machinery or press).

Pressing

The one or more sheets can be pressed at an elevated temperature and an elevated pressure to form a cooked stack. The one or more sheets can be pressed at an elevated temperature and an elevated pressure in any suitable and appropriate manner. Typically, the one or more sheets, employing a commercial size press, will be compacted at an elevated temperature and an elevated pressure.

As used herein, "press" refers to exert force against, to bear down on, or to make compact or reshape by applying steady force. See, e.g., *The American Heritage Dictionary of the English Language*, Houghton Mifflin Co., Boston, Mass. (1981).

The one or more sheets can be pressed at any suitable and appropriate temperature to form a cooked stack. For example, the one or more sheets can be pressed at a temperature of above about 50° C., above about 80° C., or above about 160° C. Specifically, the one or more sheets can be pressed at temperature of between about 100° C. and about 200° C. or between about 160° C. and about 175° C.

The one or more sheets can be pressed for any suitable and appropriate period of time to form a cooked stack. For example, the one or more sheets can be pressed for more than about 1 minute, for more than about 10 minutes, for more than about 20 minutes, or for more than about 40 minutes. Specifically, the one or more sheets can be pressed for a period of time between about 15 minutes and about 70 minutes or between about 28 minutes and about 35 minutes.

Attaching

The foam cushion or cooked stack can optionally be attached to one or more other foam cushions obtained as described herein, to form a larger-sized foam cushion. Typically, the pieces of foam cushion or cooked stack are attached on an end-to-end fashion. The attachment can be performed with any suitable device to effectively provide the larger-sized foam cushion. The attachment can be performed, e.g., employing a laser, hot knife machine, adhesive, cauterization, or any combination thereof.

Rinsing

The foam cushion can optionally be rinsed with a suitable substance to remove any debris, dirt, film, residue, non-stick substance, or piece of foam cushion that was previously cut as described above, that may exist on the foam cushion from the manufacturing process. Suitable substances useful in the optional rinsing step include, e.g., aqueous solutions that optionally include soaps and/or surfactants. Specifically, the suitable substance can be water. The suitable substance can be relatively hot or relatively cold. Specifically, the temperature of the suitable substance employed can be up to about 120° C., up to about 100° C., up to about 80° C., up to about 60° C., up to about 40° C., or up to about 20° C.

Scrubbing

The foam cushion can optionally be scrubbed to remove any debris, dirt, film, residue, non-stick substance, or piece of foam cushion that was previously cut as described above, that may exist on the foam cushion from the manufacturing process. The optional scrubbing step can be carried out with suitable non-abrasive material, e.g., a piece of foam cushion, a cloth, or a rag. Alternatively, the optional scrubbing step can be carried out with any suitable abrasive material, e.g., a brush, pad, steel wool, teflon coated scrubber, grinder, etc.

Drying

The foam cushion can optionally be dried to remove any undesirable moisture that may exist on the foam cushion from the rinsing and/or scrubbing steps described above. The optional drying step can be carried out in any suitable and appropriate manner. Specifically, the drying can be carried out by forcing relatively dry (e.g., less than 75% relative humidity, less than about 50% relative humidity, or less than about 25% relative humidity) and hot air (e.g., above about 25° C., above about 50° C., above about 75° C., or above about 100° C.) over and across the surfaces of the foam cushion. Alternatively, the drying can be carried out by allowing the foam cushion to drip-dry.

Utility

The foam cushion of the present invention can be employed in the manufacture of any suitable article of manufacture. Suitable articles of manufacture include, e.g., articles of manufacture related to one or more of the following: medical devices, footwear, orthopedic footwear, orthopedic inserts for footwear, upholstery padding for land vehicles, upholstery padding for air vehicles, upholstery padding for water vehicles, back and buttock cushions for use in wheelchairs, back and buttock cushions for use in scooters, back and buttock cushions for use in power chairs, insulation products, acoustical resistant products, thermal resistant products, electrical resistant products, electrical conductive products, vibrational resistant products, floor mat, exercise floor mat, seat padding, wall padding, padding for impact protection, flooring, flooring underlayments, siding, fencing, mattress pads, pillows, cushioning for furniture, cushioning for seat cushions, carpet underpadding, roofing, cushioning and padding material for medical treatment, cushion inserts for pipes, cushion inserts for tubes, cushion inserts for hoses, pads for floor polishing machines, cushion inserts for medical devices, padding for computer equipment, recoil cushions used in firearms, paper padding, weather stripping, cushion padding made for saddlery, cushion pads for pets, cushion bags, padded cushion for use with a shoulder or neck strap on baby carriers, mattress pads, hand grips, hand cushions, pads for use in sporting equipment, pads for protective use in sporting, sporting equipment, a sporting device, and combinations thereof.

All publications, patents, and patent documents cited herein are incorporated by reference herein, as though individually incorporated by reference. The invention has been described with reference to various specific and preferred embodiments and techniques. However, it should be understood that many variations and modifications may be made while remaining within the spirit and scope of the invention.

The invention will now be illustrated by the following non-limiting examples:

EXAMPLES

Following the General Procedure as outlined below, an article of manufacture can be produced.

General Procedure:

(1) Mix the following substances together: at least one or a resin (colored or colorless) and rubber; a blowing agent (optional), a polymeric adhesion modifier (optional), a decomposition accelerating agent (optional), a cross-linking agent (optional), and one or more auxiliary materials (optional) to form a Concentrated Batch and heat (optional) for a period of time;
(2) Cut the Concentrated Batch into desired Lumps;
(3) Thin the Lumps into thin Sheets of desired thickness;
(4) Cool (to room temperature) Sheets (optional);
(5) Cut Sheets to specific length Pieces (optional);
(6) Spray Non-Stick Substance (optional) to all surfaces of the (optionally textured) Press Mold;
(7) Layer a desired number of Pieces to form a Stack in Press Mold;
(8) Cook Stack in Press;
(9) Remove Cooked Stack from Press Mold;
(10) Cook additional Stacks separately in Press Mold;
(11) Trim/Cut Length Ends of Cooked Stacks straight (e.g., at 90° angle or at 45° angle) to Width Ends (optional);
(12) SEE BELOW;
(13) SEE BELOW;
(14) SEE BELOW;
(15) Trim/Cut Width Ends of Extended Length Finished Product Sheet to desired Width;
(16) Rinse and wash Finished Product (optional);
(17) Air dry Finished Product and roll for shipping (optional);
(18) Ship and deliver Finished Product Roll (optional); and
(19) Install Finished Product (optional).

It may be possible to do work by hand without the use of any machines or specialized equipment.

(with Cauterization or Laser):

(12) Slice skin off top and/or bottom of Cooked Stacks if desired;
(13) Slice remaining Cooked Stacks to desired thickness (Cooked Sheets); and
(14) Attach many Cooked Sheets end-to-end at Length Ends via cauterization (or laser) to form Extended Length Finished Product Sheet.

(with Glue):

(12) Attach many Cooked Stacks end-to-end at Length Ends via glue to form Extended Length Cooked Stack;
(13) Slice skin off top and/or bottom of attached Extended Length Cooked Stack if desired; and
(14) Slice remaining Extended Length Cooked Stack to desired thickness to Extended Length Finished Product Sheet.

Specifically, the resin can be ethylene vinyl acetate (EVA), the rubber can be caosu, the blowing agent can be vinylfor (AC 7), the polymeric adhesion modifier can be fusabond®, the decomposition accelerating agent can be a combination of zinc oxide and stearic acid, and the cross-linking agent can be dicumyl peroxide (DCP).

Specifically, the batches can be mixed in weights of about 50 Kg which can provide 1 lb/square yard of about 8 mm of Finished Product.

Following the General Procedure as outlined above (with the exceptions as shown below), an article of manufacture can be produced:

Example #1

(1) Mix:
44.86 Kg Ethylene Vinyl Acetate (White Colored),
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix 0.36 Kg Dicumyl Peroxide at 110° C.–130° C. for 3 minutes;

mix at 100° C.–130° C. until concentrated to 20 mm thickness.

(2) Cut (1) to 2 Kg Lumps and mix separately at 80° C.–100° C.

(3) Thin Lumps into 1 mm Sheets 6 Ft Width by 7.5 Ft Length.

(4) Cool Sheets slowly to room temperature with non-contact water cooling system.

(5) Cut Sheets to Pieces 6 Width by 7.5 Ft Length.

(6) Apply Silicone Spray to all surfaces of the textured Press Mold.

(7) Layer 50 Pieces in Height in Adjacent Stacks to form an Adjoined Pre-Cooked Stack centered in the Press Mold (with the interior perimeter of the Press Mold exposed up to 50.0% of the surface area).

(8) Cook Stack in Press for 28–35 Minutes at 160° C.–175° C.

(9) Remove Cooked Stack from Press Mold.

(10) Cook 9 additional Stacks separately in Press Mold.

(11) Trim 6 Length Ends of Cooked Stacks straight (at 90° angle) to Width Ends.

(12) Slice 1 mm skin off top and bottom of Cooked Stacks.

(13) Slice remaining Cooked Stacks to 6 mm thickness (Cooked Sheets).

(14) Attach 10 Cooked Sheets end-to-end at Length Ends via cauterization to form Extended Length Finished Product Sheet (75 Ft Length).

(15) Trim 6 Ft Width Ends of Extended Length Finished Product Sheet to 6 Ft Width.

(16) Rinse and wash Finished Product in clean, room temperature water while gently scrub washing with like material brushes.

Example #2

(1) Mix 44.86 Kg Ethylene Vinyl Acetate—White Colored,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.

(2) Cut (1) to 2 Kg Lumps and mix separately at 80° C.–100° C.

(3) Thin Lumps into 1 mm Sheets 6 Ft Width by 7.5 Ft Length.

(4) Cool Sheets slowly to room temperature with non-contact water cooling system.

(5) Cut Sheets to Pieces 6 Ft Width) by 7.5 Ft Length.

(6) Apply Silicone Spray to all surfaces of the Press Mold.

(7) Layer 50 Pieces in Height in Adjacent Stacks to form an Adjoined Pre-Cooked Stack centered in the Press Mold (with the interior perimeter of the Press Mold exposed up to 50.0% of the surface area).

(8) Cook Stack in Press for 28–35 Minutes at 160° C.–175° C.

(9) Remove Cooked Stack from Press Mold.

(10) Cook 9 additional Stacks separately in Press Mold.

(11) Trim 6 Ft Length Ends of Cooked Stacks straight (at 90° angle) to Width Ends.

(12) Slice remaining Cooked Stacks to 8 mm thickness (Cooked Sheets).

(13) Attach 10 Cooked Sheets end-to-end at Length Ends via laser to form Extended Length Finished Product Sheet (75 Ft Length).

(14) Trim 6 Ft Width Ends of Extended Length Finished Product Sheet to 6 Ft Width.

(15) Rinse and wash Finished Product in clean, room temperature water while gently scrub washing with like material brushes.

Example #3

(1) Mix 44.86 Kg Ethylene Vinyl Acetate—White Colored,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.

(2) Cut (1) to 2 Kg Lumps and mix separately at 8° C. –100° C.

(3) Thin Lumps into 1 mm Sheets 6 Ft Width by 7.5 Ft Length.

(4) Cool Sheets slowly to room temperature with non-contact water cooling system.

(5) Cut Sheets to Pieces 6 Ft Width by 7.5 Ft Length.

(6) Apply Silicone Spray to all surfaces of the Press Mold.

(7) Layer 52 Pieces in Height in Adjacent Stacks to form an Adjoined Pre-Cooked Stack centered in the Press Mold (with interior perimeter of the Press Mold exposed up to 50.0% of the surface area).

(8) Cook Stack in Press for 28–35 Minutes at 160° C.–175° C.

(9) Remove Cooked Stack from Press Mold.

(10) Cook 9 additional Stacks separately in Press Mold.

(11) Trim 6 Ft Length Ends of Cooked Stacks straight (at 45° angle) to Width Ends.

(12) Slice 1 mm skin off top and bottom of Cooked Stacks.

(13) Slice remaining Cooked Stacks to 10 mm thickness (Cooked Sheets).

(14) Attach 10 Cooked Sheets end-to-end at Length Ends via cauterization to form Extended Length Finished Product Sheet (75 Ft Length).

(15) Trim 6 Ft Width Ends of Extended Length Finished Product Sheet to 6 Ft Width.

(16) Rinse and wash Finished Product in clean, room temperature water while gently scrub washing with like material brushes.

Example #4

(1) Mix 44.86 Kg Ethylene Vinyl Acetate—White Colored,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.

(2) Cut (1) to 2 Kg Lumps and mix separately at 80° C.–100° C.
(3) Thin Lumps into 1 mm Sheets 6 Ft Width by 7.5 Ft Length.
(4) Cool Sheets slowly to room temperature with non-contact water cooling system.
(5) Cut Sheets to Pieces 6 Ft Width by 7.5 Ft Length.
(6) Apply Silicone Spray to all surfaces of the textured Press Mold.
(7) Layer 50 Adjoined Pre-Cooked Stack centered in the Press Mold (with interior perimeter of the Press Mold exposed up to 50.0% of the surface area).
(8) Cook Stack in Press for 28–35 Minutes at 160° C.–175° C.
(9) Remove Cooked Stack from Press Mold.
(10) Cook 9 additional Stacks separately in Press Mold.
(11) Trim 6 Ft Length Ends of Cooked Stacks straight (e.g., at 90° angle) to Width Ends.
(12) Slice 1 mm skin off top and bottom of Cooked Stacks.
(13) Slice remaining Cooked Stacks to 12 mm thickness (Cooked Sheets).
(14) Attach 10 Cooked Sheets end-to-end at Length Ends via cauterization to form Extended Length Finished Product Sheet (75 Ft Length).
(15) Trim 6 Ft Width Ends of Extended Length Finished Product Sheet to 6 Ft Width.
(16) Rinse and wash Finished Product in clean, room temperature water while gently scrub washing with like material brushes.

Example #5

(1) Mix 44.86 Kg Ethylene Vinyl Acetate—White Colored,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 6 Ft Width by 3 Ft Length.
(4) Cool Sheets slowly to room temperature with non-contact water cooling system.
(5) Cut Sheets to Pieces 6 Ft Width by 3 Ft Length.
(6) Apply Silicone Spray to all surfaces of the Press Mold.
(7) Layer 50 Pieces in Height in one Adjacent Stack to form an Adjoined Pre-Cooked Stack centered in the Press Mold (with interior perimeter of the Press Mold exposed up to 50.0% of the surface area).
(8) Cook Stack in Press for 28–35 Minutes at 160° C.–175° C.
(9) Remove Cooked Stack from Press Mold.
(10) Cook 24 additional Stacks separately in Press Mold.
(11) Trim 3 Ft Length Ends of Cooked Stacks straight (e.g., at 45° angle) to Width Ends.
(12) Slice remaining Cooked Stacks to 6 mm thickness (Cooked Sheets).
(13) Attach 25 Cooked Sheets end-to-end at Length Ends via laser to form Extended Length Finished Product Sheet (75 Ft Length).
(14) Trim 6 Ft Width Ends of Extended Length Finished Product Sheet to 6 Ft Width.
(15) Rinse and wash Finished Product in clean, room temperature water while gently scrub washing with like material brushes.

Example #6

(1) Mix 44.86 Kg Ethylene Vinyl Acetate—White Colored,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 6 Ft Width by 3 Ft Length.
(4) Cool Sheets slowly to room temperature with non-contact water cooling system.
(5) Cut Sheets to Pieces 6 Ft Width by 3 Ft Length.
(6) Apply Silicone Spray to all surfaces of the Press Mold.
(7) Layer 50 Pieces in Height in Adjacent Stacks to form an Adjoined Pre-Cooked Stack centered in the Press Mold (with interior perimeter of the Press Mold exposed up to 50.0% of the surface area).
(8) Cook Stack in Press for 28–35 Minutes at 160° C.–175° C.
(9) Remove Cooked Stack from Press Mold.
(10) Cook 24 additional Stacks separately in Press Mold.
(11) Trim 3 Ft Length Ends of Cooked Stacks straight (e.g., at 90° angle) to Width Ends.
(12) Slice 1 mm skin off top and bottom of Cooked Stacks.
(13) Slice remaining Cooked Stacks to 8 mm thickness (Cooked Sheets).
(14) Attach 25 Cooked Sheets end-to-end at Length Ends via cauterization to form Extended Length Finished Product Sheet (75 Ft Length).
(15) Trim 6 Ft Width Ends of Extended Length Finished Product Sheet to 6 Ft Width.
(16) Rinse and wash Finished Product in clean, room temperature water while gently scrub washing with like material brushes.

Example #7

(1) Mix 44.86 Kg Ethylene Vinyl Acetate—White Colored,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 6 Ft Width by 3 Ft Length.
(4) Cool Sheets slowly to room temperature with non-contact water cooling system.
(5) Cut Sheets to Pieces 6 Ft Width by 3 Ft Length.

(6) Apply Silicone Spray to all surfaces of the textured Press Mold.
(7) Layer 50 Pieces in Height in one Adjacent Stack to form an Adjoined Pre-Cooked Stack centered in the Press Mold (with interior perimeter of the Press Mold exposed up to 50.0% of the surface area).
(8) Cook Stack in Press for 28–35 Minutes at 160° C.–175° C.
(9) Remove Cooked Stack from Press Mold.
(10) Cook 24 additional Stacks separately in Press Mold.
(11) Trim 3 Ft Length Ends of Cooked Stacks straight (e.g., at 45° angle) to Width Ends.
(12) Slice 1 mm skin off top and bottom of Cooked Stacks.
(13) Slice remaining Cooked Stacks to 10 mm thickness (Cooked Sheets).
(14) Attach 25 Cooked Sheets end-to-end at Length Ends via cauterization to form Extended Length Finished Product Sheet (75 Ft Length).
(15) Trim 6 Ft Width Ends of Extended Length Finished Product Sheet to 6 Ft Width.
(16) Rinse and wash Finished Product in clean, room temperature water while gently scrub washing with like material brushes.

Example #8

(1) Mix 44.86 Kg Ethylene Vinyl Acetate—White Colored,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 6 Ft Width by 3 Ft Length.
(4) Cool Sheets slowly to room temperature with non-contact water cooling system.
(5) Cut Sheets to Pieces 6 Ft Width by 3 Ft Length.
(6) Apply Silicone Spray to all surfaces of the textured Press Mold.
(7) Layer 50 Pieces in Height in one Adjacent Stack to form an Adjoined Pre-Cooked Stack centered in the Press Mold (with interior perimeter of the Press Mold exposed up to 50.0% of the surface area).
(8) Cook Stack in Press for 28–35 Minutes at 160° C.–175° C.
(9) Remove Cooked Stack from Press Mold.
(10) Cook 24 additional Stacks separately in Press Mold.
(11) Trim 3 Ft Length Ends of Cooked Stacks straight (e.g., at 45° angle) to Width Ends.
(12) Slice 1 mm skin off top and bottom of Cooked Stacks.
(13) Slice remaining Cooked Stacks to 12 mm thickness (Cooked Sheets).
(14) Attach 25 Cooked Sheets end-to-end at Length Ends via laser to form Extended Length Finished Product Sheet (75 Ft Length).
(15) Trim 6 Ft Width Ends of Extended Length Finished Product Sheet to 6 Ft Width.
(16) Rinse and wash Finished Product in clean, room temperature water while gently scrub washing with like material brushes.

Example #9

(1) Mix 44.86 Kg Ethylene Vinyl Acetate—Black Colored,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 4 Ft Width by 8 Ft Length.
(4) Cool Sheets slowly to room temperature with non-contact water cooling system.
(5) Cut Sheets to Pieces 4 Ft Width by 8 Ft Length.
(6) Apply Silicone Spray to all surfaces of the Press Mold.
(7) Layer 50 Pieces in Height in Adjacent Stacks to form an Adjoined Pre-Cooked Stack centered in the Press Mold (with interior perimeter of the Press Mold exposed up to 50.0% of the surface area).
(8) Cook Stack in Press for 28–35 Minutes at 160° C.–175° C.
(9) Remove Cooked Stack from Press Mold.
(10) Cook additional Stacks separately in Press Mold.
(11) Trim 8 Ft Length Ends of Cooked Stacks straight (e.g., at 45° angle) to Width Ends.
(12) Slice remaining Cooked Stacks in Half to 25 mm (or other) thickness (Cooked Halved Stacks).
(13) Do Not Attach for a single (4 Ft Width by 8 Ft length) Mat, or Attach Cooked Halved Stacks end-to-end at Length Ends via cauterization to form an Extended Length Finished Product Mat.
(14) Trim 4 Ft Width Ends of Single or Extended Length Finished Product Halved Stack to 4 Ft Width.
(15) Rinse and wash Finished Product in clean, room temperature water while gently scrub washing with like material brushes.

Example #10

(1) Mix 44.86 Kg Ethylene Vinyl Acetate—Yellow Colored,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 3 Ft Width by 6 Ft Length.
(4) Cool Sheets slowly to room temperature with non-contact water cooling system.
(5) Cut Sheets to Pieces 3 Ft Width by 6 Ft Length.
(6) Apply Silicone Spray to all surfaces of the textured Press Mold.
(7) Layer 50 Pieces in Height in one Adjacent Stack to form an Adjoined Pre-Cooked Stack centered in the Press Mold (with interior perimeter of the Press Mold exposed up to 50.0% of the surface area).
(8) Cook Stack in Press for 28–35 Minutes at 160° C.–175° C.
(9) Remove Cooked Stack from Press Mold.
(10) Cook additional Stacks separately in Press Mold.
(11) Trim 6 Ft Length Ends of Cooked Stacks straight (e.g., at 45° angle) to Width Ends.
(12) Slice remaining Cooked Stacks in Half to 25 mm thickness (Cooked Halved Stacks).
(13) Do Not Attach for a single (3 Ft Width by 6 Ft length) Pad, or Cut Cooked Halved Stacks in half to form Two single (3 Ft Width by 3 Ft length) Pads.
(14) Trim 3 Ft Width Ends of Finished Product Pad to 3 Ft Width.
(15) Rinse and wash Finished Product in clean, room temperature water while gently scrub washing with like material brushes.

Example #11

(1) Mix 44.86 Kg Ethylene Vinyl Acetate—Yellow Colored,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 3 Ft Width by 6 Ft Length.
(4) Cool Sheets slowly to room temperature with non-contact water cooling system.
(5) Cut Sheets to Pieces 3 Ft Width by 6 Ft Length.
(6) Apply Silicone Spray to all surfaces of the Press Mold.
(7) Layer 30 Pieces in Height in one Adjacent Stack to form an Adjoined Pre-Cooked Stack centered in the Press Mold (with interior perimeter of the Press Mold exposed up to 50.0% of the surface area).
(8) Cook Stack in Press for 18–26 Minutes at 160° C.–175° C.
(9) Remove Cooked Stack from Press Mold.
(10) Cook additional Stacks separately in Press Mold.
(11) Trim 6 Ft Length Ends of Cooked Stacks straight (e.g., at 45° angle) to Width Ends.
(12) Do Not slice skin off top or bottom of Cooked Stacks.
(13) Slice remaining Cooked Stacks in Half to 15 mm thickness (Cooked Halved Stacks).
(14) Do Not Attach for a single (3 Ft Width by 6 Ft length) Pad, or Cut Cooked Halved Stacks in half to form Two single (3 Ft Width by 3 Ft length) Pads, or Attach desired number of Cooked Halved Stacks end-to-end at Length Ends via cauterization to form Extended Length Finished Pad Product.
(15) Trim 3 Ft Width Ends of Finished Pad Product to 3 Ft Width.
(16) Rinse and wash Finished Product in clean, room temperature water while gently scrub washing with like material brushes.

Example #12

(1) Mix 44.86 Kg Ethylene Vinyl Acetate—White (or other) Colored,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 4 Ft Width by 8 Ft Length.
(4) Cool Sheets slowly to room temperature with non-contact water cooling system.
(5) Cut Sheets to Pieces 4 Ft Width by 8 Ft Length.
(6) Apply Silicone Spray to all surfaces of the Press Mold.
(7) Layer 50 Pieces in Height in one Adjacent Stack to form an Adjoined Pre-Cooked Stack centered in the Press Mold (with interior perimeter of the Press Mold exposed up to 50.0% of the surface area).
(8) Cook Stack in Press for 28–35 Minutes at 160° C.–175° C.
(9) Remove Cooked Stack from Press Mold.
(10) Cook additional Stacks separately in Press Mold.
(11) Trim 8 Ft Length Ends of Cooked Stacks straight (e.g., at 90° angle) to Width Ends.
(12) Do Not Slice or Slice remaining Cooked Stacks in Half to 25 mm thickness (Cooked Halved Stacks).
(13) Do Not Attach for a single (4 Ft Width by 8 Ft length) Product, or Cut Cooked Non-Halved and Halved Stacks in half to form Two single (4 Ft Width by 4 Ft length) Product.
(14) Trim 4 Ft Width Ends of Finished Product to 4 Ft Width.
(15) Rinse and wash Finished Product in clean, room temperature water while gently scrub washing with like material brushes.

Example #13

(1) Mix 44.86 Kg Ethylene Vinyl Acetate—White (or other) Colored,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 4 Ft Width by 8 Ft Length.
(4) Cool Sheets slowly to room temperature with non-contact water cooling system.
(5) Cut Sheets to Pieces 4 Ft Width by 8 Ft Length.
(6) Apply Silicone Spray to all surfaces of the textured Press Mold.
(7) Layer 50 Pieces in Height in Adjacent Stacks to form an Adjoined Pre-Cooked Stack centered in the Press Mold (with interior perimeter of the Press Mold exposed up to 50.0% of the surface area).
(8) Cook Stack in Press for 28–35 Minutes at 160° C.–175° C.
(9) Remove Cooked Stack from Press Mold.
(10) Cook additional Stacks separately in Press Mold.
(11) Trim 8 Ft Length Ends of Cooked Stacks straight (e.g., at 45° angle) to Width Ends. Trim 4 Ft Width Ends of Finished Product to 4 Ft Width.
(12) Slice 1 mm skin off top or bottom of Cooked Stacks.
(13) Cut Cooked Stacks at 4 Inch along 8 Ft Length Cooked Stacks to form Products with the following dimensions 2"×4"×8' or 2"×6"×8'.
(14) Do Not Attach Product.
(15) Do Not Trim.
(16) Rinse and wash Finished Product in clean, room temperature water while gently scrub washing with like material brushes.

Example #14

(1) Mix 44.86 Kg Ethylene Vinyl Acetate—
two (or more) Separate Batches each with a Different Color,
4.49 Kg Rubber,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 4 Ft Width by 8 Ft Length for Primary Color. Thin Lumps into 1 mm Sheets 4 Ft Width by 8 Ft Length for Secondary Color.
(4) Cool Sheets slowly to room temperature with non-contact water cooling system.
(5) Cut Sheets to Pieces 2 Ft Width by 4 Ft Length.
(6) Apply Silicone Spray to all surfaces of the Press Mold.
(7) Layer one Primary Color Sheet as desired and one Secondary Color Sheet as desired and roll tightly together along Length for a Log Diameter >50 mm, and duplicate additional identical Logs and place side-by-side along length until a number of Adjoined Pre-Cooked Logs are centered in the Press Mold (with the interior perimeter of the Press Mold exposed up to 50.0% of the surface area).
(8) Cook Adjoined Logs in Press for 28–35 Minutes at 160° C.–175° C.
(9) Remove Cooked Adjoined Logs as Stack from Press Mold.
(10) Cook additional Adjoined Logs separately in Press Mold.
(11) Trim 8 Ft Length Ends of Cooked Stacks straight (e.g., at 45° angle) to Width Ends.
(12) Slice skin off top and bottom of Cooked Stacks for maximum exposure of patterning (optional).
(13) Slice remaining Cooked Stacks in Half to approximately 25 mm thickness (Cooked Halved Stacks).
(14) Attach for a single (4 Ft Width by 8 Ft length) Product.
(15) Trim 4 Ft Width Ends of Finished Product to 4 Ft Width.
(16) Rinse and wash Finished Product in clean, room temperature water while gently scrub washing with like material brushes.

Example #15

(1) Mix 44.86 Kg Ethylene Vinyl Acetate—
two (or more) Separate Batches each with a Different Color,
4.49 Kg Rubber,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 4 Ft Width by 8 Ft Length for Primary Color. Thin Lumps into 1 mm Sheets 4 Ft Width by 8 Ft Length for Secondary Color.
(4) Cool Sheets slowly to room temperature with non-contact water cooling system.
(5) Cut Sheets to Pieces 2 Ft Width by 4 Ft Length.
(6) Apply Silicone Spray to all surfaces of the Press Mold.
(7) Layer one Primary Color Sheet as desired and one Secondary Color Sheet as desired and roll tightly together along Length for a Log Diameter>50 mm, and duplicate additional identical Logs and place side-by-side along length until a number of Adjoined Pre-Cooked Logs are centered in the Press Mold (with the interior perimeter of the Press Mold exposed up to 50.0% of the surface area).
(8) Cook Adjoined Logs in Press for 28–35 Minutes at 160° C.–175° C.
(9) Remove Cooked Adjoined Logs as Stack from Press Mold.
(10) Cook additional Adjoined Logs separately in Press Mold.
(11) Trim 8 Ft Length Ends of Cooked Stacks straight (e.g., at 90° angle) to Width Ends. Trim 4 Ft Width Ends of Finished Product to 4 Ft Width.
(12) Slice skin off top and bottom of Cooked Stacks for maximum exposure of patterning.
(13) Slice remaining Cooked Stacks to desired thickness (Cooked Sheets). Cut Cooked Stacks at 4 Inch along 8 Ft Length Cooked Stacks to form Products with the following approximate dimensions 2"×4"×8' or 2"×6"×8'.
(14) Attach.
(15) Trim.
(16) Rinse and wash Finished Product in clean, room temperature water while gently scrub washing with like material brushes.

Example #16

(1) Mix 44.86 Kg Ethylene Vinyl Acetate—
two (or more) Separate Batches each with a Different Color,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;

mix at 100° C.–130° C. until concentrated to 20 mm thickness.
(2) Cut (1) to 2 Kg Lumps and mix separately at 80° C.–100° C.
(3) Thin Lumps into 1 mm Sheets 4 Ft Width by 8 Ft Length for Primary Color. Thin Lumps into 1 mm Sheets 4 Ft Width by 8 Ft Length for Secondary Color.
(4) Cool Sheets slowly to room temperature with non-contact water cooling system.
(5) Cut Sheets to Pieces 2 Ft Width by 4 Ft Length.
(6) Apply Silicone Spray to all surfaces of the Press Mold.
(7) Layer Primary Color Sheets as desired and Secondary Color Sheets as desired and fold tightly back and forth together like an accordion along Length to a Height>50 mm, and duplicate additional identical Folded Multi-Layers and place side-by-side along length until a number of Adjoined Pre-Cooked Folded Multi-Layers are centered in the Press Mold (with the interior perimeter of the Press Mold exposed up to 50.0% of the surface area).
(8) Cook Adjoined Folded Multi-Layers in Press for 28–35 Minutes at 160° C.–175° C.
(9) Remove Cooked Adjoined Folded Multi-Layers as Stack from Press Mold.
(10) Cook additional Adjoined Folded Multi-Layers separately in Press Mold.
(11) Trim 8 Ft Length Ends of Cooked Stacks straight (e.g., at 45° angle) to Width Ends.
(12) Slice skin off top and bottom of Cooked Stacks for maximum exposure of patterning.
(13) Do Not Slice or Slice remaining Cooked Stacks in Half to approximately 25 mm thickness (Cooked Halved Stacks).
(14) Cut Cooked Non-Halved and Halved Stacks in half to form Two single (4 Ft Width by 4 Ft length) Product.
(15) Trim 4 Ft Width Ends of Finished Product to 4 Ft Width.
(16) Rinse and wash Finished Product in clean, room temperature water while gently scrub washing with like material brushes.

Example #17

(1) Mix 44.86 Kg Ethylene Vinyl Acetate—
two (or more) Separate Batches each with a Different Color,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 4 Ft Width by 8 Ft Length for Primary Color. Thin Lumps into 1 mm Sheets 4 Ft Width by 8 Ft Length for Secondary Color.
(4) Cool Sheets slowly to room temperature with non-contact water cooling system.
(5) Cut Sheets to Pieces 4 Ft Width by 8 Ft Length.
(6) Apply Silicone Spray to all surfaces of the (textured) Press Mold.
(7) Layer a combined 50 Primary and alternating Secondary Colored Pieces in Height in one or more Adjacent Stacks to form an Adjoined Pre-Cooked Stack centered in the Press Mold (with interior perimeter of the Press Mold exposed up to 50.0% of the surface area), and manually integrate by use of single direction motions.
(8) Cook Stack in Press for 28–35 Minutes at 160° C.–175° C.
(9) Remove Cooked Stack from Press Mold.
(10) Cook additional Stacks separately in Press Mold.
(11) Trim 8 Ft Length Ends of Cooked Stacks straight (e.g., at 45° angle) to Width Ends.
(12) Do Not Slice remaining Cooked Stacks in Half.
(13) Cut Cooked Non-Halved and Halved Stacks in half to form Two single (4 Ft Width by 4 Ft length) Product.
(14) Trim 4 Ft Width Ends of Finished Product to 4 Ft Width.
(15) Rinse and wash Finished Product in clean, room temperature water while gently scrub washing with like material brushes.

Example #18

(1) Mix 44.86 Kg Ethylene Vinyl Acetate—two(or more) Separate Batches each with a Different Color,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 4 Ft Width by 8 Ft Length.
(4) Cool Sheets slowly to room temperature with non-contact water cooling system.
(5) Cut Primary Colored Sheets to Pieces 4 Ft Width by 8 Ft Length. Cut Secondary Colored Sheets to smaller Pieces sufficient to form Secondary Colored single colored Spheres of all different colors and sizes up to 50 mm in Diameter.
(6) Apply Silicone Spray to all surfaces of the textured Press Mold.
(7) Layer 30–40 Primary Colored Pieces in Height in Adjacent Stacks to form an Adjoined Pre-Cooked Stack centered in the Press Mold (with interior perimeter of the Press Mold exposed up to 50.0% of the surface area).
(8) Cook Stack in Press for 2–5 Minutes at 160° C.–175° C. Open Press and Add Secondary Colored single colored Un-Cooked Spheres of all different colors and sizes up to 50 mm in Diameter (in any desired pattern) atop Primary Colored Pre-Cooked Stack, with weight and volume ratios of the Pre-Cooked Stack to Un-Cooked Spheres being closely equivalent. Cook Modified Stack in Press for 28–35 Minutes at 160° C.–175° C.
(9) Remove Cooked Stack from Press Mold.
(10) Cook additional Modified Stacks separately in Press Mold.
(11) Trim 8 Ft Length Ends of Cooked Stacks straight (e.g., at 90° angle or at 45° angle) to Width Ends.
(12) Slice remaining Cooked Stacks in Half to 25 mm (or other) thickness (Cooked Halved Stacks).
(13) Attach Cooked Halved Stacks end-to-end at Length Ends via cauterization to form an Extended Length Finished Product Mat.

(14) Trim 4 Ft Width Ends of Single Finished Product Halved Stack to 4 Ft Width. Rinse and wash Finished Product in clean, room temperature water while gently scrub washing with like material brushes.

Example #19

(1) Mix 44.86 Kg Ethylene Vinyl Acetate—
two (or more) Separate Batches each with a Different Color,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lumps into 1 mm Sheets 4 Ft Width by 8 Ft Length.
(4) Cool Sheets slowly to room temperature with non-contact water cooling system.
(5) Cut Primary Colored Sheets to Pieces 4 Ft Width by 8 Ft Length. Cut single colored Secondary Colored Sheets to smaller Pieces of all different desired colors and sizes 1 Inch to 1 Ft Width by 1 Inch to 1 Ft Length.
(6) Apply Silicone Spray to all surfaces of the Press Mold.
(7) Layer 20 Primary Colored Pieces as desired between the equivalent of 30 Layers of detached single colored Secondary Colored smaller Pieces of all different desired colors and sizes for a combined total of 50 Layers in Height in one Adjacent Stack to form an Adjoined Pre-Cooked Modified Stack centered in the Press Mold (with interior perimeter of the Press Mold exposed up to 50.0% of the surface area).
(8) Cook Modified Stack in Press for 28–35 Minutes at 160° C.–175° C.
(9) Remove Cooked Stack from Press Mold.
(10) Cook additional Modified Stacks separately in Press Mold.
(11) Trim 8 Ft Length Ends of Cooked Stacks straight (e.g., at 90° angle) to Width Ends.
(12) Do Not slice skin off top or bottom of Cooked Stacks.
(13) Slice remaining Cooked Stacks in Half to 25 mm thickness (Cooked Halved Stacks).
(14) Do Not Attach for a single (4 Ft Width by 8 Ft length) Mat, to form an Extended Length Finished Product Mat.
(15) Trim 4 Ft Width Ends of Single Length Finished Product Halved Stack to 4 Ft Width.
(16) Rinse and wash Finished Product in clean, room temperature water while gently scrub washing with like material brushes.

Example #20

(1) Mix 44.86 Kg Ethylene Vinyl Acetate—Any Color,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
[put Lumps into heated automated extruding machine.]
(3) Thin Lumps into 1 mm Sheets 4 Ft Width by 8 Ft Length.
(4) Cool Sheets slowly to room temperature with non-contact water cooling system.
(5) Cut Sheets to smaller Pieces sufficient to form single colored Sphere Lumps of sizes up to 50 mm in Diameter.
(6) Fill Sphere Halves in lower section of Press Mold with Sphere Lumps.
(7) Cook Sphere Halves in Press for 28–35 Minutes at 160° C.–175° C.
(8) Remove Cooked Sphere Halves from Press Mold.
(9) Cook additional Sphere Halves separately in Press Mold.
(10) Trim Sphere Halves straight.
(11) Do Not slice skin off top or bottom of Cooked Sphere Halves.
(12) Do Not slice Cooked Sphere Halves.
(13) Attach Cooked Sphere Halves to form Spheres via glue.
(14) Do Not Trim.
(15) Rinse and wash Finished Product in clean, room temperature water while gently scrub washing with like material brushes.

Example #21

(1) Mix 44.86 Kg Ethylene Vinyl Acetate—Any Color,
4.49 Kg Rubber,
2.06 Kg Vinyfor AC 7,
1.79 Kg Fusabond,
0.90 Kg Zinc Oxide, and
0.54 Kg Stearic Acid,
at 110° C.–130° C. for 15 Minutes; and mix
0.36 Kg Dicumyl Peroxide at 110° C.–130° C. for 3 Minutes;
mix at 100° C.–130° C. until concentrated to 20 mm thickness.
(2) Cut (1) to 2 Kg Lumps and mix separately at 80° C.–100° C.
(3) Thin Lump into 1 mm Sheets 4 Ft Width by 8 Ft Length.
(4) Cool Sheets slowly to room temperature with non-contact water cooling system.
(5) Cut Sheets to smaller Pieces sufficient to form single colored Sphere Lumps of sizes up to 50 mm in Diameter.
(6) Apply Silicone Spray to all surfaces of the textured Press Mold with desired Shaped Halves in lower section and flat surface on top section of Press Mold.
(7) Fill Shaped Halves in lower section of Press Mold with Sphere Lumps.
(8) Cook Shaped Halves in Press for 28–35 Minutes at 160° C.–175° C.
(9) Remove Cooked Shaped Halves from Press Mold.
(10) Cook additional Shaped Halves separately in Press Mold.
(11) Trim Shaped Halves straight.
(12) Do Not slice Cooked Shaped Halves.
(13) Attach Cooked Shaped Halves to form desired Shape Product via cauterization.
(14) Do Not Trim.
(15) Rinse and wash Finished Product in clean, room temperature water while gently scrubwashing with like material brushes.

Example #22

(1) Mix 40.79 Kg Ethylene Vinyl Acetate—Any Color,
 4.08 Kg Rubber,
 1.88 Kg Vinyfor AC 7,
 1.63 Kg Fusabond,
 0.82 Kg Zinc Oxide, and
 0.49 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #23

(1) Mix 44.87 Kg Ethylene Vinyl Acetate—Any Color,
 4.08 Kg Rubber,
 1.88 Kg Vinyfor AC 7,
 1.63 Kg Fusabond,
 0.82 Kg Zinc Oxide, and
 0.49 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #24

(1) Mix 42.83 Kg Ethylene Vinyl Acetate—Any Color,
 2.04 Kg Rubber,
 1.88 Kg Vinyfor AC 7,
 1.63 Kg Fusabond,
 0.82 Kg Zinc Oxide, and
 0.49 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #25

(1) Mix 43.48 Kg Ethylene Vinyl Acetate—Any Color,
 2.04 Kg Rubber,
 1.88 Kg Vinyfor AC 7,
 1.63 Kg Fusabond,
 0.41 Kg Zinc Oxide, and
 0.425 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #26

(1) Mix 45.19 Kg Ethylene Vinyl Acetate—Any Color,
 0.00 Kg Rubber,
 1.88 Kg Vinyfor AC 7,
 1.63 Kg Fusabond,
 0.41 Kg Zinc Oxide, and
 0.425 Kg Stearic Acid,
 at 110° C.–130° C. for 15 Minutes; and mix
 0.65 Kg Dicumyl Peroxide at 110° C.–130° C. for 3 Minutes;
 mix at 100° C.–130° C. until concentrated to 20 mm thickness.

Example #27

(1) Mix 36.71 Kg Ethylene Vinyl Acetate—Any Color,
 8.16 Kg Rubber,
 1.88 Kg Vinyfor AC 7,
 1.63 Kg Fusabond,
 0.82 Kg Zinc Oxide, and
 0.49 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #28

(1) Mix 32.63 Kg Ethylene Vinyl Acetate—Any Color,
 12.24 Kg Rubber,
 1.88 Kg Vinyfor AC 7,
 1.63 Kg Fusabond,
 0.82 Kg Zinc Oxide, and
 0.49 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #29

(1) Mix 31.32 Kg Ethylene Vinyl Acetate—Any Color,
 12.24 Kg Rubber,
 1.88 Kg Vinyfor AC 7,
 1.63 Kg Fusabond,
 1.63 Kg Zinc Oxide, and
 0.98 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #30

(1) Mix 30.02 Kg Ethylene Vinyl Acetate—Any Color,
 12.24 Kg Rubber,
 1.88 Kg Vinyfor AC 7,
 1.63 Kg Fusabond,
 2.45 Kg Zinc Oxide, and
 1.47 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #31

(1) Mix 31.17 Kg Ethylene Vinyl Acetate—Any Color,
 12.24 Kg Rubber,
 1.26 Kg Vinyfor AC 7,
 1.10 Kg Fusabond,
 2.45 Kg Zinc Oxide, and
 1.47 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #32

(1) Mix 43.99 Kg Ethylene Vinyl Acetate—Any Color,
 0.00 Kg Rubber,
 2.75 Kg Vinyfor AC 7,
 2.06 Kg Fusabond,
 0.55 Kg Zinc Oxide, and
 0.33 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #33

(1) Mix 43.99 Kg Ethylene Vinyl Acetate—Any Color,
 0.00 Kg Rubber,
 2.75 Kg Vinyfor AC 7,
 1.63 Kg Fusabond,
 0.82 Kg Zinc Oxide, and
 0.49 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #34

(1) Mix 43.99 Kg Ethylene Vinyl Acetate—Any Color,
 0.00 Kg Rubber,
 2.75 Kg Vinyfor AC 7,
 2.28 Kg Fusabond,
 0.41 Kg Zinc Oxide, and
 0.25 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #35

(1) Mix 43.99 Kg Ethylene Vinyl Acetate—Any Color,
 0.00 Kg Rubber,
 2.75 Kg Vinyfor AC 7,
 1.88 Kg Fusabond,
 0.82 Kg Zinc Oxide, and
 0.25 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #36

(1) Mix 43.67 Kg Ethylene Vinyl Acetate—Any Color,
 0.00 Kg Rubber,
 2.75 Kg Vinyfor AC 7,
 1.63 Kg Fusabond,
 0.82 Kg Zinc Oxide, and
 0.49 Kg Stearic Acid,
 at 110° C.–130° C. for 15 Minutes; and mix
 0.65 Kg Dicumyl Peroxide at 110° C.–130° C. for 3 Minutes;
 mix at 100° C.–130° C. until concentrated to 20 mm thickness.

Example #37

(1) Mix 44.48 Kg Ethylene Vinyl Acetate—Any Color,
 0.00 Kg Rubber,
 2.00 Kg Vinyfor AC 7,
 2.00 Kg Fusabond,
 0.55 Kg Zinc Oxide, and
 0.33 Kg Stearic Acid,
 at 110° C.–130° C. for 15 Minutes; and mix
 0.65 Kg Dicumyl Peroxide at 110° C.–130° C. for 3 Minutes;
 mix at 100° C.–130° C. until concentrated to 20 mm thickness.

Example #38

(1) Mix 44.80 Kg Ethylene Vinyl Acetate—Any Color,
 0.00 Kg Rubber,
 2.00 Kg Vinyfor AC 7,
 2.00 Kg Fusabond,
 0.55 Kg Zinc Oxide, and
 0.33 Kg Stearic Acid,
 at 110° C.–130° C. for 15 Minutes; and mix
 0.33 Kg Dicumyl Peroxide at 110° C.–130° C. for 3 Minutes;
 mix at 100° C.–130° C. until concentrated to 20 mm thickness.

Example #39

(1) Mix 31.09 Kg Ethylene Vinyl Acetate—Any Color,
 12.24 Kg Rubber,
 1.41 Kg Vinyfor AC 7,
 2.00 Kg Fusabond,
 1.63 Kg Zinc Oxide, and
 0.98 Kg Stearic Acid,
 at 110° C.–130° C. for 15 Minutes; and mix
 0.65 Kg Dicumyl Peroxide at 110° C.–130° C. for 3 Minutes;
 mix at 100° C.–130° C. until concentrated to 20 mm thickness.

Example #40

(1) Mix 27.01 Kg Ethylene Vinyl Acetate—Any Color,
16.32 Kg Rubber,
1.41 Kg Vinyfor AC 7,
2.00 Kg Fusabond,
1.63 Kg Zinc Oxide, and
0.98 Kg Stearic Acid,
at 110° C.–130° C. for 15 Minutes; and mix
0.65 Kg Dicumyl Peroxide at 110° C.–130° C. for 3 Minutes;
mix at 100° C.–130° C. until concentrated to 20 mm thickness.

Example #41

(1) Mix 26.51 Kg Ethylene Vinyl Acetate—Any Color,
16.32 Kg Rubber,
1.41 Kg Vinyfor AC 7,
2.50 Kg Fusabond,
1.63 Kg Zinc Oxide, and
0.98 Kg Stearic Acid,
at 110° C.–130° C. for 15 Minutes; and mix
0.65 Kg Dicumyl Peroxide at 110° C.–130° C. for 3 Minutes;
mix at 100° C.–130° C. until concentrated to 20 mm thickness.

Example #42

(1) Mix 25.92 Kg Ethylene Vinyl Acetate—Any Color,
16.32 Kg Rubber,
2.00 Kg Vinyfor AC 7,
2.50 Kg Fusabond,
1.63 Kg Zinc Oxide, and
0.98 Kg Stearic Acid,
at 110° C.–130° C. for 15 Minutes; and mix
0.65 Kg Dicumyl Peroxide at 110° C.–130° C. for 3 Minutes;
mix at 100° C.–130° C. until concentrated to 20 mm thickness.

Example #43

(1) Mix 26.25 Kg Ethylene Vinyl Acetate—Any Color,
16.32 Kg Rubber,
2.00 Kg Vinyfor AC 7,
2.50 Kg Fusabond,
1.63 Kg Zinc Oxide, and
0.98 Kg Stearic Acid,
at 110° C.–130° C. for 15 Minutes; and mix
0.33 Kg Dicumyl Peroxide at 110° C.–130° C. for 3 Minutes;
mix at 100° C.–130° C. until concentrated to 20 mm thickness.

Example #44

(1) Mix 25.44 Kg Ethylene Vinyl Acetate—Any Color,
16.32 Kg Rubber,
2.00 Kg Vinyfor AC 7,
2.00 Kg Fusabond,
2.45 Kg Zinc Oxide, and
1.47 Kg Stearic Acid,
at 110° C.–130° C. for 15 Minutes; and mix
0.33 Kg Dicumyl Peroxide at 110° C.–130° C. for 3 Minutes;
mix at 100° C.–130° C. until concentrated to 20 mm thickness.

Example #45

(1) Mix 26.03 Kg Ethylene Vinyl Acetate—Any Color,
16.32 Kg Rubber,
1.41 Kg Vinyfor AC 7,
2.00 Kg Fusabond,
2.45 Kg Zinc Oxide, and
1.47 Kg Stearic Acid,
at 110° C.–130° C. for 15 Minutes; and mix
0.33 Kg Dicumyl Peroxide at 110° C.–130° C. for 3 Minutes;
mix at 100° C.–130° C. until concentrated to 20 mm thickness.

Example #46

(1) Mix 44.18 Kg Ethylene Vinyl Acetate—Any Color,
0.00 Kg Rubber,
2.75 Kg Vinyfor AC 7,
2.25 Kg Fusabond,
0.41 Kg Zinc Oxide, and
0.25 Kg Stearic Acid,
at 110° C.–130° C. for 15 Minutes; and mix
0.16 Kg Dicumyl Peroxide at 110° C.–130° C. for 3 Minutes;
mix at 100° C.–130° C. until concentrated to 20 mm thickness.

Example #47

(1) Mix 44.35 Kg Ethylene Vinyl Acetate—Any Color,
0.00 Kg Rubber,
2.75 Kg Vinyfor AC 7,
2.25 Kg Fusabond,
0.25 Kg Zinc Oxide, and
0.25 Kg Stearic Acid,
at 110° C.–130° C. for 15 Minutes; and mix
0.16 Kg Dicumyl Peroxide at 110° C.–130° C. for 3 Minutes;
mix at 100° C.–130° C. until concentrated to 20 mm thickness.

Example #48

(1) Mix 44.31 Kg Ethylene Vinyl Acetate—Any Color,
0.00 Kg Rubber,
2.75 Kg Vinyfor AC 7,
2.25 Kg Fusabond,
0.41 Kg Zinc Oxide, and
0.12 Kg Stearic Acid,
at 110° C.–130° C. for 15 Minutes; and mix
0.16 Kg Dicumyl Peroxide at 110° C.–130° C. for 3 Minutes;
mix at 100° C.–130° C. until concentrated to 20 mm thickness.

Example #49

(1) Mix 44.40 Kg Ethylene Vinyl Acetate—Any Color,
   0.00 Kg Rubber,
   2.75 Kg Vinyfor AC 7,
   2.25 Kg Fusabond,
   0.20 Kg Zinc Oxide, and
   0.20 Kg Stearic Acid,
   at 110° C.–130° C. for 15 Minutes; and mix
   0.20 Kg Dicumyl Peroxide at 110° C.–130° C. for 3 Minutes;
   mix at 100° C.–130° C. until concentrated to 20 mm thickness.

Example #50

(1) Mix 45.40 Kg Ethylene Vinyl Acetate—Any Color,
   0.00 Kg Rubber,
   2.00 Kg Vinyfor AC 7,
   2.00 Kg Fusabond,
   0.20 Kg Zinc Oxide, and
   0.20 Kg Stearic Acid,
   at 110° C.–130° C. for 15 Minutes; and mix
   0.20 Kg Dicumyl Peroxide at 110° C.–130° C. for 3 Minutes;
   mix at 100° C.–130° C. until concentrated to 20 mm thickness.

Example #51

(1) Mix 25.60 Kg Ethylene Vinyl Acetate—Any Color,
   16.32 Kg Rubber,
   2.00 Kg Vinyfor AC 7,
   2.00 Kg Fusabond,
   2.45 Kg Zinc Oxide, and
   1.47 Kg Stearic Acid,
   at 110° C.–130° C. for 15 Minutes; and mix
   0.16 Kg Dicumyl Peroxide at 110° C.–130° C. for 3 Minutes;
   mix at 100° C.–130° C. until concentrated to 20 mm thickness.

Example #52

(1) Mix 25.69 Kg Ethylene Vinyl Acetate—Any Color,
   16.32 Kg Rubber,
   1.75 Kg Vinyfor AC 7,
   2.00 Kg Fusabond,
   2.45 Kg Zinc Oxide, and
   1.47 Kg Stearic Acid,
   at 110° C.–130° C. for 15 Minutes; and mix
   0.33 Kg Dicumyl Peroxide at 110° C.–130° C. for 3 Minutes;
   mix at 100° C.–130° C. until concentrated to 20 mm thickness.

Example #54

(1) Mix 26.44 Kg Ethylene Vinyl Acetate—Any Color,
   16.32 Kg Rubber,
   1.00 Kg Vinyfor AC 7,
   2.00 Kg Fusabond,
   2.45 Kg Zinc Oxide, and
   1.47 Kg Stearic Acid,
   at 110° C.–130° C. for 15 Minutes; and mix
   0.33 Kg Dicumyl Peroxide at 110° C.–130° C. for 3 Minutes;
   mix at 110° C.–130° C. until concentrated to 20 mm thickness.

Example #55

(1) Mix 26.10 Kg Ethylene Vinyl Acetate—Any Color,
   16.32 Kg Rubber,
   1.50 Kg Vinyfor AC 7,
   2.00 Kg Fusabond,
   2.45 Kg Zinc Oxide, and
   1.47 Kg Stearic Acid,
   at 110° C.–130° C. for 15 Minutes; and mix
   0.16 Kg Dicumyl Peroxide at 110° C.–130° C. for 3 Minutes;
   mix at 100° C.–130° C. until concentrated to 20 mm thickness.

Example #56

(1) Mix 18.85 Kg Ethylene Vinyl Acetate—Any Color,
   21.76 Kg Rubber,
   2.50 Kg Vinyfor AC 7,
   1.50 Kg Fusabond,
   3.27 Kg Zinc Oxide, and
   1.96 Kg Stearic Acid,
   at 110° C.–130° C. for 15 Minutes; and mix
   0.16 Kg Dicumyl Peroxide at 110° C.–130° C. for 3 Minutes;
   mix at 100° C.–130° C. until concentrated to 20 mm thickness.

Example #57

(1) Mix 19.35 Kg Ethylene Vinyl Acetate—Any Color,
   21.76 Kg Rubber,
   2.00 Kg Vinyfor AC 7,
   1.50 Kg Fusabond,
   3.27 Kg Zinc Oxide, and
   1.96 Kg Stearic Acid,
   at 110° C.–130° C. for 15 Minutes; and mix
   0.16 Kg Dicumyl Peroxide at 110° C.–130° C. for 3 Minutes;
   mix at 100° C.–130° C. until concentrated to 20 mm thickness.

Example #58

(1) Mix 18.60 Kg Ethylene Vinyl Acetate—Any Color,
   21.76 Kg Rubber,
   2.75 Kg Vinyfor AC 7,
   1.50 Kg Fusabond,
   3.27 Kg Zinc Oxide, and
   1.96 Kg Stearic Acid,
   at 110° C.–130° C. for 15 Minutes; and mix
   0.16 Kg Dicumyl Peroxide at 110° C.–130° C. for 3 Minutes;
   mix at 100° C.–130° C. until concentrated to 20 mm thickness.

Example #59

(1) Mix 18.81 Kg Ethylene Vinyl Acetate—Any Color,
   21.76 Kg Rubber,
   2.50 Kg Vinyfor AC 7,
   1.00 Kg Fusabond,
   3.27 Kg Zinc Oxide, and
   2.50 Kg Stearic Acid,
   at 110° C.–130° C. for 15 Minutes; and mix
   0.16 Kg Dicumyl Peroxide at 110° C.–130° C. for 3 Minutes;
   mix at 100° C.–130° C. until concentrated to 20 mm thickness.

Example #60

(1) Mix 18.35 Kg Ethylene Vinyl Acetate—Any Color,
   21.76 Kg Rubber,
   3.00 Kg Vinyfor AC 7,
   1.50 Kg Fusabond,
   3.27 Kg Zinc Oxide, and
   1.96 Kg Stearic Acid,
   at 110° C.–130° C. for 15 Minutes; and mix
   0.16 Kg Dicumyl Peroxide at 110° C.–130° C. for 3 Minutes;
   mix at 100° C.–130° C. until concentrated to 20 mm thickness.

Example #61

(1) Mix 13.91 Kg Ethylene Vinyl Acetate—Any Color,
   27.20 Kg Rubber,
   2.00 Kg Vinyfor AC 7,
   1.50 Kg Fusabond,
   3.27 Kg Zinc Oxide, and
   1.96 Kg Stearic Acid,
   at 110° C.–130° C. for 15 Minutes; and mix
   0.16 Kg Dicumyl Peroxide at 110° C.–130° C. for 3 Minutes;
   mix at 100° C.–130° C. until concentrated to 20 mm thickness.

Example #62

(1) Mix 11.60 Kg Ethylene Vinyl Acetate—Any Color,
   27.20 Kg Rubber,
   3.00 Kg Vinyfor AC 7,
   1.50 Kg Fusabond,
   4.08 Kg Zinc Oxide, and
   2.45 Kg Stearic Acid,
   at 110° C.–130° C. for 15 Minutes; and mix
   0.16 Kg Dicumyl Peroxide at 110° C.–130° C. for 3 Minutes;
   mix at 100° C.–130° C. until concentrated to 20 mm thickness.

Example #63

(1) Mix 11.10 Kg Ethylene Vinyl Acetate—Any Color,
   27.20 Kg Rubber,
   3.50 Kg Vinyfor AC 7,
   1.50 Kg Fusabond,
   4.08 Kg Zinc Oxide, and
   2.45 Kg Stearic Acid,
   at 110° C.–130° C. for 15 Minutes; and mix
   0.16 Kg Dicumyl Peroxide at 110° C.–130° C. for 3 Minutes;
   mix at 100° C.–130° C. until concentrated to 20 mm thickness.

Example #64

(1) Mix 6.16 Kg Ethylene Vinyl Acetate—Any Color,
   32.64 Kg Rubber,
   3.00 Kg Vinyfor AC 7,
   1.50 Kg Fusabond,
   4.08 Kg Zinc Oxide, and
   2.45 Kg Stearic Acid,
   at 110° C.–130° C. for 15 Minutes; and mix
   0.16 Kg dicumyl Peroxide at 110° C.–130° C. for 3 Minutes;
   mix at 100° C.–130° C. until concentrated to 20 mm thickness.

Example #65

(1) Mix 4.86 Kg Ethylene Vinyl Acetate—Any Color,
   32.64 Kg Rubber,
   3.50 Kg Vinyfor AC 7,
   1.00 Kg Fusabond,
   4.90 Kg Zinc Oxide, and
   2.94 Kg Stearic Acid,
   at 110° C.–130° C. for 15 Minutes; and mix
   0.16 Kg Dicumyl Peroxide at 110° C.–130° C. for 3 Minutes;
   mix at 100° C.–130° C. until concentrated to 20 mm thickness.

Example #66

(1) Mix 44.75 Kg Ethylene Vinyl Acetate—Any Color,
   0.00 Kg Rubber,
   2.75 Kg Vinyfor AC 7,
   2.00 Kg Fusabond,
   0.15 Kg Zinc Oxide, and
   0.15 Kg Stearic Acid,
   at 110° C.–130° C. for 15 Minutes; and mix
   0.20 Kg Dicumyl Peroxide at 110° C.–130° C. for 3 Minutes;
   mix at 100° C.–130° C. until concentrated to 20 mm thickness.

Example #67

(1) Mix 44.95 Kg Ethylene Vinyl Acetate—Any Color,
   0.00 Kg Rubber,
   2.75 Kg Vinyfor AC 7,
   2.00 Kg Fusabond,
   0.05 Kg Zinc Oxide, and
   0.05 Kg Stearic Acid,
   at 110° C.–130° C. for 15 Minutes; and mix
   0.20 Kg Dicumyl Peroxide at 110° C.–130° C. for 3 Minutes;
   mix at 100° C.–130° C. until concentrated to 20 mm thickness.

Example #68

(1) Mix 44.75 Kg Ethylene Vinyl Acetate—Any Color,
   0.00 Kg Rubber,
   2.75 Kg Vinyfor AC 7,
   2.00 Kg Fusabond,
   0.20 Kg Zinc Oxide, and
   0.10 Kg Stearic Acid,
   at 110° C.–130° C. for 15 Minutes; and mix
   0.20 Kg Dicumyl Peroxide at 110° C.–130° C. for 3 Minutes;
   mix at 100° C.–130° C. until concentrated to 20 mm thickness.

Example #69

(1) Mix 45.55 Kg Ethylene Vinyl Acetate—Any Color,
   0.00 Kg Rubber,
   2.00 Kg Vinyfor AC 7,
   2.00 Kg Fusabond,
   0.20 Kg Zinc Oxide, and
   0.10 Kg Stearic Acid,
   at 110° C.–130° C. for 15 Minutes; and mix
   0.15 Kg Dicumyl Peroxide at 110° C.–130° C. for 3 Minutes;
   mix at 100° C.–130° C. until concentrated to 20 mm thickness.

Example #70

(1) Mix 45.90 Kg Ethylene Vinyl Acetate—Any Color,
   0.00 Kg Rubber,
   1.88 Kg Vinyfor AC 7,
   1.63 Kg Fusabond,
   0.20 Kg Zinc Oxide, and
   0.20 Kg Stearic Acid,
   at 110° C.–130° C. for 15 Minutes; and mix
   0.20 Kg Dicumyl Peroxide at 110° C.–130° C. for 3 Minutes;
   mix at 100° C.–130° C. until concentrated to 20 mm thickness.

Example #71

(1) Mix 46.60 Kg Ethylene Vinyl Acetate—Any Color,
   0.00 Kg Rubber,
   1.40 Kg Vinyfor AC 7,
   1.40 Kg Fusabond,
   0.20 Kg Zinc Oxide, and
   0.20 Kg Stearic Acid,
   at 110° C.–130° C. for 15 Minutes; and mix
   0.20 Kg Dicumyl Peroxide at 110° C.–130° C. for 3 Minutes;
   mix at 100° C.–130° C. until concentrated to 20 mm thickness.

Example #72

(1) Mix 46.05 Kg Ethylene Vinyl Acetate—Any Color,
   0.00 Kg Rubber,
   1.88 Kg Vinyfor AC 7,
   1.63 Kg Fusabond,
   0.20 Kg Zinc Oxide, and
   0.10 Kg Stearic Acid,
   at 110° C.–130° C. for 15 Minutes; and mix
   0.15 Kg Dicumyl Peroxide at 110° C.–130° C. for 3 Minutes;
   mix at 100° C.–130° C. until concentrated to 20 mm thickness.

Example #73

(1) Mix 46.55 Kg Ethylene Vinyl Acetate—Any Color,
   0.00 Kg Rubber,
   1.50 Kg Vinyfor AC 7,
   1.50 Kg Fusabond,
   0.20 Kg Zinc Oxide, and
   0.10 Kg Stearic Acid,
   at 110° C.–130° C. for 15 Minutes; and mix
   0.15 Kg Dicumyl Peroxide at 110° C.–130° C. for 3 Minutes;
   mix at 100° C.–130° C. until concentrated to 20 mm thickness.

Example #74

(1) Mix 46.85 Kg Ethylene Vinyl Acetate—Any Color,
   0.00 Kg Rubber,
   is 1.40 Kg Vinyfor AC 7,
   1.40 Kg Fusabond,
   0.10 Kg Zinc Oxide, and
   0.10 Kg Stearic Acid,
   at 110° C.–130° C. for 15 Minutes; and mix
   0.15 Kg Dicumyl Peroxide at 110° C.–130° C. for 3 Minutes;
   mix at 100° C.–130° C. until concentrated to 20 mm thickness.

Example #75

(1) Mix 46.95 Kg Ethylene Vinyl Acetate—Any Color,
   0.00 Kg Rubber,
   1.30 Kg Vinyfor AC 7,
   1.30 Kg Fusabond,
   0.20 Kg Zinc Oxide, and
   0.10 Kg Stearic Acid,
   at 110° C.–130° C. for 15 Minutes; and mix
   0.15 Kg Dicumyl Peroxide at 110° C.–130° C. for 3 Minutes;
   mix at 100° C.–130° C. until concentrated to 20 mm thickness.

Example #76

(1) Mix 47.15 Kg Ethylene Vinyl Acetate—Any Color,
   0.00 Kg Rubber,
   1.20 Kg Vinyfor AC 7,
   1.20 Kg Fusabond,
   0.20 Kg Zinc Oxide, and
   0.10 Kg Stearic Acid,
   at 110° C.–130° C. for 15 Minutes; and mix
   0.15 Kg Dicumyl Peroxide at 110° C.–130° C. for 3 Minutes;
   mix at 100° C.–130° C. until concentrated to 20 mm thickness.

Example #77

(1) Mix 5.41 Kg Ethylene Vinyl Acetate—Any Color,
  32.64 Kg Rubber,
  3.50 Kg Vinyfor AC 7,
  1.00 Kg Fusabond,
  4.50 Kg Zinc Oxide, and
  2.75 Kg Stearic Acid,
  at 110° C.–130° C. for 15 Minutes; and mix
  0.20 Kg Dicumyl Peroxide at 110° C.–130° C. for 3 Minutes;
  mix at 100° C.–130° C. until concentrated to 20 mm thickness.

Example #78

(1) Mix 5.31 Kg Ethylene Vinyl Acetate—Any Color,
  32.64 Kg Rubber,
  3.50 Kg Vinyfor AC 7,
  1.00 Kg Fusabond,
  4.50 Kg Zinc Oxide, and
  2.75 Kg Stearic Acid,
  at 110° C.–130° C. for 15 Minutes; and mix
  0.30 Kg Dicumyl Peroxide at 110° C.–130° C. for 3 Minutes;
  mix at 100° C.–130° C. until concentrated to 20 mm thickness.

Example #79

(1) Mix 5.21 Kg Ethylene Vinyl Acetate—Any Color,
  32.64 Kg Rubber,
  3.50 Kg Vinyfor AC 7,
  1.00 Kg Fusabond,
  4.50 Kg Zinc Oxide, and
  2.75 Kg Stearic Acid,
  at 110° C.–130° C. for 15 Minutes; and mix
  0.40 Kg Dicumyl Peroxide at 110° C.–130° C. for 3 Minutes;
  mix at 100° C.–130° C. until concentrated to 20 mm thickness.

Example #80

(1) Mix 6.16 Kg Ethylene Vinyl Acetate—Any Color,
  32.64 Kg Rubber,
  3.50 Kg Vinyfor AC 7,
  1.00 Kg Fusabond,
  4.50 Kg Zinc Oxide, and
  2.00 Kg Stearic Acid,
  at 110° C.–130° C. for 15 Minutes; and mix
  0.20 Kg Dicumyl Peroxide at 110° C.–130° C. for 3 Minutes;
  mix at 100° C.–130° C. until concentrated to 20 mm thickness.

Example #82

(1) Mix 5.66 Kg Ethylene Vinyl Acetate—Any Color,
  32.64 Kg Rubber,
  3.50 Kg Vinyfor AC 7,
  1.50 Kg Fusabond,
  4.50 Kg Zinc Oxide, and
  2.00 Kg Stearic Acid,
  at 110° C.–130° C. for 15 Minutes; and mix
  0.20 Kg Dicumyl Peroxide at 110° C.–130° C. for 3 Minutes;
  mix at 100° C.–130° C. until concentrated to 20 mm thickness.

Example #83

(1) Mix 0.00 Kg Ethylene Vinyl Acetate—Any Color,
  39.30 Kg Rubber,
  4.00 Kg Vinyfor AC 7,
  0.50 Kg Fusabond,
  4.00 Kg Zinc Oxide, and
  2.00 Kg Stearic Acid,
  at 110° C.–130° C. for 15 Minutes; and mix
  0.20 Kg Dicumyl Peroxide at 110° C.–130° C. for 3 Minutes;
  mix at 100° C.–130° C. until concentrated to 20 mm thickness.

Example #84

(1) Mix 0.00 Kg Ethylene Vinyl Acetate—Any Color,
  38.80 Kg Rubber,
  4.00 Kg Vinyfor AC 7,
  1.00 Kg Fusabond,
  4.00 Kg Zinc Oxide, and
  2.00 Kg Stearic Acid,
  at 110° C.–130° C. for 15 Minutes; and mix
  0.20 Kg Dicumyl Peroxide at 110° C.–130° C. for 3 Minutes;
  mix at 100° C.–130° C. until concentrated to 20 mm thickness.

What is claimed is:

1. A foam cushion formed from:
  (a) natural rubber;
  (b) ethylene-vinyl acetate (EVA) copolymer;
  (c) azodicarbonamide (AC);
  (d) a polymeric adhesion modifier;
  (e) dicumyl peroxide; and
  (f) a combination of zinc oxide and stearic acid.

2. The foam cushion of claim 1 wherein the natural rubber (NR) is obtained from the *Hevea brasiliensis* tree, the guayule bush *Parthenoim argentatum*, the Sapotaceae tree, or a combination thereof.

3. The foam cushion of claim 1 wherein the natural rubber (NR) is a latex grade.

4. The foam cushion of claim 3 wherein the latex grade is ribbed smoked sheet (RSS), white and pale crepes, pure blanket crepes, or a combination thereof.

5. The foam cushion of claim 1 wherein the natural rubber (NR) is a remilled grade.

6. The foam cushion of claim 5 wherein the remilled grade is estate brown crepes, estate compo crepes, thin brown crepes or remils, thick brown crepes or ambers, flat bark crepes, or a combination thereof.

7. The foam cushion of claim 1 wherein the natural rubber (NR) is technically-specified natural rubber (TSR), superior processing natural rubber (SP), technically classified natural rubber (TC), air-dried sheet natural rubber (ADS), skin natural rubber, deproteinized natural rubber (DPNR), oil-extended natural rubber (OENR), hevealplus MG natural rubber, epoxidized natural rubber, or a combination thereof.

8. The foam cushion of claim 1 wherein the natural rubber (NR) comprises cis-polyisoprene.

9. The foam cushion of claim 1 wherein the natural rubber (NR) comprises trans-polyisoprene.

10. The foam cushion of claim 1 wherein the natural rubber (NR) comprises a mixture of cis- and trans-polyisoprene.

11. The foam cushion of claim 1 wherein the natural rubber (NR) comprises about 93 wt. % to about 95 wt. % of polyisoprene.

12. The foam cushion wherein claim 1 the natural rubber is employed up to about 80 wt. % of the foam cushion.

13. The foam cushion of claim 1 wherein the natural rubber is employed in about 5 wt. % to about 12 wt. % of the foam cushion.

14. The foam cushion of claim 1 wherein the natural rubber is employed in about 7 wt. % to about 9 wt. % of the foam cushion.

15. The foam cushion of claim 1 wherein the ethylene-vinyl acetate (EVA) copolymer comprises about 15 wt. % to about 75 wt. % vinyl acetate.

16. The foam cushion of claim 1 wherein the ethylene-vinyl acetate (EVA) is employed up to about 95 wt. % of the foam cushion.

17. The foam cushion of claim 1 wherein the ethylene-vinyl acetate (EVA) is employed in about 79 wt. % to about 83 wt. % of the foam cushion.

18. The foam cushion of claim 1 wherein the ethylene-vinyl acetate (EVA) is employed in about 80.5 wt. % to about 82.5 wt. % of the foam cushion.

19. The foam cushion of claim 1 wherein the azodicarbonamide (AC) is employed in about 0.1 wt. % to about 10 wt. % of the foam cushion.

20. The foam cushion of claim 1 wherein the azodicarbonamide (AC) is employed in about 3 wt. % to about 4.2 wt. % of the foam cushion.

21. The foam cushion of claim 1 wherein the azodicarbonamide (AC) is employed in about 3.5 wt. % to about 4.0 wt. % of the foam cushion.

22. The foam cushion of claim 1 wherein the polymeric adhesion modifier comprises an anhydride grafted polyolefin resin, a styrene maleic anhydride (SMA) copolymer, or a combination thereof.

23. The foam cushion of claim 1 wherein the polymeric adhesion modifier comprises a maleic anhydride grafted polyolefin resin.

24. The foam cushion of claim 1 wherein the polymeric adhesion modifier comprises an anhydride grafted polyolefin resin, wherein the polyolefin is selected from polyethylene, polypropylene, EPDM, ethylene vinyl acetate (EVA), a copolymer thereof, and combinations thereof.

25. The foam cushion of claim 1 wherein the polymeric adhesion modifier comprises modified ethylene acrylate carbon monoxide terpolymers, ethylene vinyl acetates (EVAs), polyethylene, metallocene polyeythylenes, ethylene propylene rubbers, polypropylenes, or a combination thereof.

26. The foam cushion of claim 1 wherein the polymeric adhesion modifier is employed in about 0.5 wt. % to about 15.0 wt. % of the foam cushion.

27. The foam cushion of claim 1 wherein the polymeric adhesion modifier is employed in about 2.8 wt. % to about 3.9 wt. % of the foam cushion.

28. The foam cushion of claim 1 wherein the polymeric adhesion modifier is employed in about 3.0 wt. % to about 3.5 wt. % of the foam cushion.

29. The foam cushion of claim 1 wherein the zinc oxide and stearic acid is employed up to about 25 wt. % of the foam cushion.

30. The foam cushion of claim 1 wherein the zinc oxide and stearic acid is employed in about 1.5 wt. % to about 13.5 wt. % of the foam cushion.

31. The foam cushion of claim 1 wherein the zinc oxide and stearic acid is employed in about 2.0 wt. % to about 13.0 wt. % of the foam cushion.

32. The foam cushion of claim 1 further comprising at least one of a cure retarder, a reinforcing agent, a filler, an extender, a placticizer, a vulcanization agent, an antioxidant, a fire retardant, an accelerator, a colorant, an electrically conductive material, and a stabilizer.

33. A foam cushion formed from:
(a) natural rubber employed in about 5 wt. % to about 12 wt. % of the foam cushion;
(b) an ethylene-vinyl acetate (EVA) copolymer employed in about 79 wt. % to about 83 wt. % of the foam cushion;
(c) azodicarbonamide (AC) employed in about 3 wt. % to about 4.2 wt. % of the foam cushion;
(d) a polymeric adhesion modifier employed in about 2.8 wt. % to about 3.9 wt. % of the foam cushion;
(e) dicumyl peroxide employed in about 0.5 wt. % to about 0.9 wt. % of the foam cushion; and
(f) a combination of zinc oxide and stearic acid, wherein the zinc oxide is employed in about 1.0 wt. % to about 2.2 wt. % of the foam cushion and stearic acid is employed in about 0.5 wt. % to about 1.25 wt. % of the foam cushion.

34. The foam cushion of claim 33 further comprising at least one of a cure retarder, a reinforcing agent, a filler, an extender, a placticizer, a vulcanization agent, an antioxidant, a fire retardant, an accelerator, a colorant, an electrically conductive material, and a stabilizer.

* * * * *

UNITED STATES PATENT AND TRADEMARK OFFICE
CERTIFICATE OF CORRECTION

PATENT NO. : 6,818,676 B2
DATED : November 16, 2004
INVENTOR(S) : Koffler et al.

It is certified that error appears in the above-identified patent and that said Letters Patent is hereby corrected as shown below:

Title page,
Item [56], References Cited, OTHER PUBLICATIONS,
"Bennett, H," reference, (first occurrence) delete "definiton" and insert -- Definition --, therefor.
"Bennett, H," reference, (third occurrence) delete "Definiton" and insert -- Definition --; therefor.
"Kroschwitz, Jacqueline I.," reference, (first occurrence) delete "." and insert -- , -- before "Kirk".
"Kroschwitz, Jacqueline I.," reference, (second occurrence) delete "Phosphorous" and insert -- Phosphorus --, therefor.
"Morris, William," reference, after "Boston" delete ";" and insert -- : --, therefor.
"Techomic Publishing Company," reference, after "Co." delete ",".
"Troitzsch, Jurgen H.," reference, delete "Us" and insert -- US --, therefor.

Column 2,
Line 25, delete "(o)" and insert -- (f) --, therefor.

Column 3,
Line 41, after "DETAILED" insert -- DESCRIPTION --.

Column 4,
Line 63, after "1070C" delete ".".

Column 5,
Line 51, delete "Minn." insert -- MI --, therefor.

Column 6,
Line 54, delete "Thermoplasitic" and insert -- Thermoplastic --, therefor.

Column 9,
Line 18, delete "crosslink" and insert -- cross-link --, therefor.

Column 10,
Line 66, delete "crosslinking" and insert -- cross-linking --, therefor.

Column 11,
Line 23, after "butanediol" insert -- , --.

UNITED STATES PATENT AND TRADEMARK OFFICE
CERTIFICATE OF CORRECTION

PATENT NO. : 6,818,676 B2
DATED : November 16, 2004
INVENTOR(S) : Koffler et al.

It is certified that error appears in the above-identified patent and that said Letters Patent is hereby corrected as shown below:

<u>Column 14,</u>
Line 3, after "in" delete "into".

<u>Column 35,</u>
Line 19, delete "4.08" and insert -- 0.00 --, therefor.
Line 53, delete "0.425" and insert -- 0.25 --, therefor.

<u>Column 46,</u>
Line 27, delete "is" before "1.40".

<u>Column 49,</u>
Line 11, delete "wherein claim 1" and insert -- of claim 1 wherein --, therefor.

<u>Column 50,</u>
Line 2, delete "polyeythylenes" and insert -- polyethylene --, therefor.

Signed and Sealed this

Tenth Day of May, 2005

JON W. DUDAS
*Director of the United States Patent and Trademark Office*